（12） United States Patent
Yoon et al.

(10) Patent No.: US 12,456,124 B2
(45) Date of Patent: Oct. 28, 2025

(54) MANAGING USER CONSENT FOR PURPOSE DOCUMENT

(71) Applicant: Hewlett-Packard Development Company, L.P., Spring, TX (US)

(72) Inventors: Junghyeon Yoon, Seongnam-si (KR); Junghun Kim, Seongnam-si (KR); Min Namgoong, Seongnam-si (KR); Jinkyu Kook, Seongnam-si (KR); Byeongju Hwang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 324 days.

(21) Appl. No.: 18/018,107

(22) PCT Filed: Jan. 19, 2021

(86) PCT No.: PCT/US2021/013881
§ 371 (c)(1),
(2) Date: Jan. 26, 2023

(87) PCT Pub. No.: WO2022/025980
PCT Pub. Date: Feb. 3, 2022

(65) Prior Publication Data
US 2023/0267474 A1 Aug. 24, 2023

(30) Foreign Application Priority Data
Jul. 30, 2020 (KR) .................. 10-2020-0095022

(51) Int. Cl.
*G06F 21/62* (2013.01)
*G06Q 30/01* (2023.01)
(52) U.S. Cl.
CPC .................. *G06Q 30/01* (2013.01)

(58) Field of Classification Search
CPC ........................... G06F 21/6218; G06F 16/93
See application file for complete search history.

(56) References Cited

U.S. PATENT DOCUMENTS

| 7,269,853 | B1 | 9/2007 | Dunn |
| 8,515,981 | B2 | 8/2013 | Nakamoto et al. |
| 9,058,469 | B2 | 6/2015 | Rodriguez et al. |
| 9,529,980 | B2 | 12/2016 | Powell |
| 10,616,206 | B2 | 4/2020 | Nadler et al. |
| 2007/0038765 | A1 | 2/2007 | Dunn |
| 2015/0350892 | A1 | 12/2015 | Johansson |

(Continued)

FOREIGN PATENT DOCUMENTS

WO 2016/060858 A1 4/2016

*Primary Examiner* — Thaddeus J Plecha
(74) *Attorney, Agent, or Firm* — Brooks, Cameron & Huebsch, PLLC

(57) ABSTRACT

An example operation method of a server implemented by a processor comprises registering a target to which a purpose document is applied, obtaining common information of the purpose document, generating purpose-customized information for the target by combining the common information with information of the target, generating user consent information by combining the purpose-customized information with user information, according to a request from a terminal on which the target is executed, and updating a state of the user consent information according to information input for the user consent information from the terminal.

17 Claims, 14 Drawing Sheets

(56) References Cited

U.S. PATENT DOCUMENTS

| | | |
|---|---|---|
| 2019/0005210 A1 | 1/2019 | Wiederspohn et al. |
| 2019/0392171 A1 | 12/2019 | Barday et al. |
| 2021/0158462 A1* | 5/2021 | Kuhlman ............ G06F 16/2379 |
| 2021/0334402 A1* | 10/2021 | Detchemendy ....... H04L 63/108 |
| 2022/0067196 A1* | 3/2022 | Qu ...................... G06F 21/6245 |

* cited by examiner

MANAGING USER CONSENT FOR PURPOSE DOCUMENT

BACKGROUND

A purpose document refers to a document having a purpose such as collecting and utilizing personal information, a contract, a policy, and the like. For example, a purpose document may include terms and conditions, an end user license agreement (EULA), a privacy policy, and the like. A user may consent to the purpose document before using a product and/or service. In that case, the product and/or service provider should manage the user consent information. Here, types and versions of the purpose document and languages in which the purpose document is written may vary, and consent from the user should be made again when the purpose document is modified.

DETAILED DESCRIPTION

Figure 1:
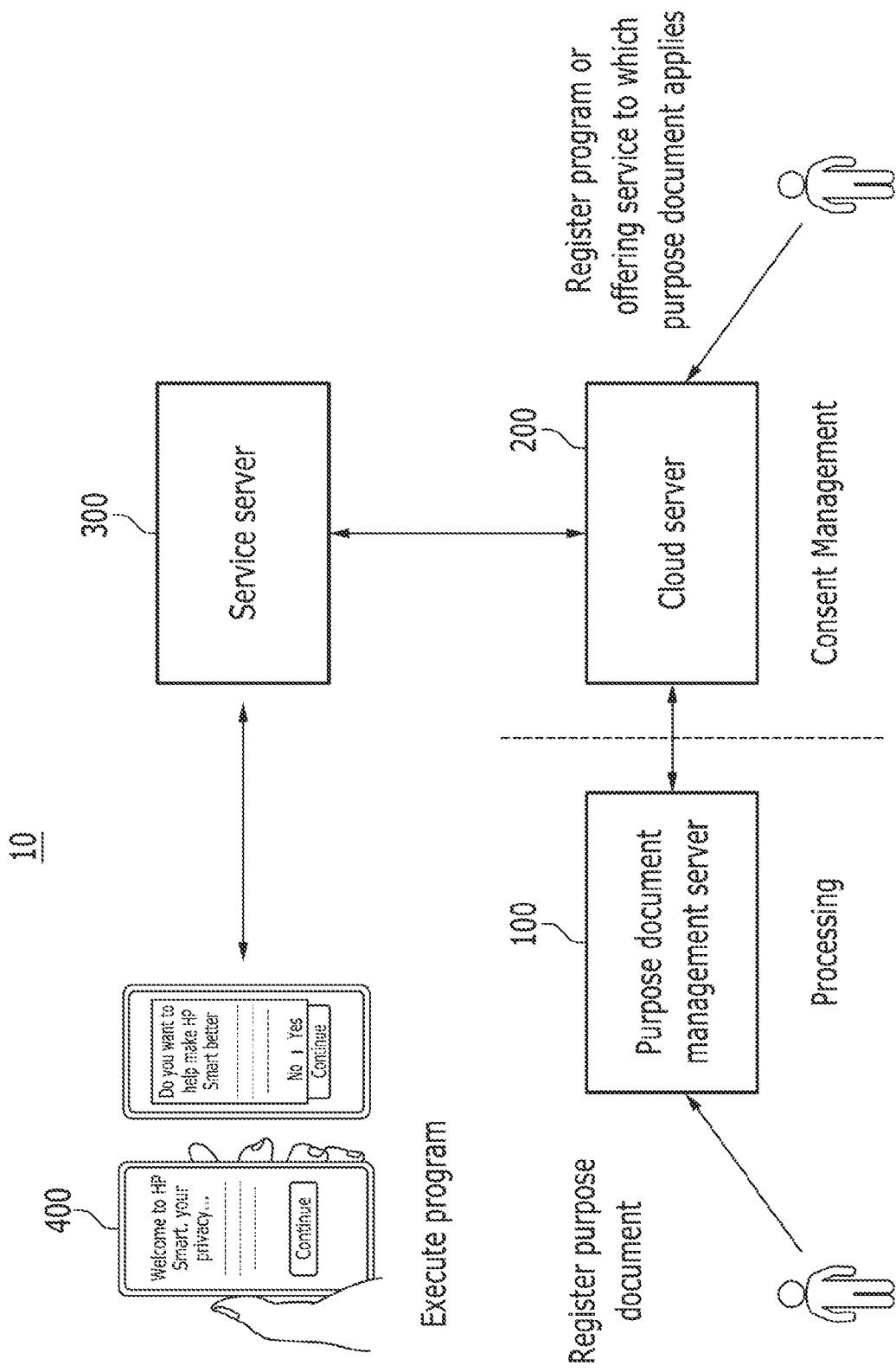
FIG. 1 is a diagram illustrating a system for managing a purpose document and user consent according to an example.

Hereinafter, examples of the present disclosure will be described with reference to the attached drawings so that a person of ordinary skill in the art may easily implement the present disclosure. However, the present disclosure may be modified in various ways and is not limited to the examples described herein. In the drawings, like reference numerals designate like elements throughout the specification.

Throughout the specification, when a part is described to "include" or "comprise" a certain element, it means that it may further include other elements rather than exclude other elements, unless specifically indicated otherwise.

In the description, terms such as "transmit" or "provide" may be used to include not only direct transmission or provision but also indirect transmission or provision through another device or by using a bypass.

Throughout the specification, singular forms such as "a," "an," and "the" are intended to include plural forms as well, unless an explicit expression such as "one" or "singular" is used.

In the description, an operation order described in a flowchart may be changed, several operations may be merged, certain operations may be divided, and specific operations may not be performed.

In the description, terms such as " . . . unit," " . . . group," " . . . module," and the like refer to units that process a function or an operation, which may be implemented with hardware, software, or a combination thereof.

In the description, a server may be implemented with hardware including a processor, a memory, a communication device, and the like, and a computer program being executed in combination with the hardware may be stored in a predetermined space. The hardware may be capable of implementing an example method of the present disclosure. The computer program may include instructions that implement an example operation method of the present disclosure described with reference to the accompanying drawings, and execute an example of the present disclosure in combination with hardware such as a processor, a memory, and the like.

In the description, a document related to a purpose, such as a document collecting and utilizing personal information, a contract, a policy, and the like, and further related to content requiring user consent thereto is referred to as a "purpose document." In an example, the purpose document may include content that legally requires user consent. The purpose document may be referred to as a "consent form," but will be referred to as a "purpose document" in order to distinguish from the term "user consent." The purpose document may be variously realized as, for example, a terms and conditions document, an end user license agreement (EULA), a privacy policy, and the like.

When a provider provides a program to a user, for utilization of information collected by the program to serve a purpose described in a purpose document, user consent to the purpose document should be obtained. In various examples, the user may consent to the purpose document to use the program or may withdraw the consent.

The program provided by the provider to the user may vary and may include software variously referred to as an application program, a solution program, and the like. In an example, the provider may additionally provide a paid or free service related to a program such as an application, and such service may be referred to as an offering service. In this case, the provider should obtain consent to the purpose document for each offering service, aside from consent to the purpose document obtained for the program. Here, the offering service may be managed depending on the program. A program or an offering service depending on a program is referred to as a target to which the purpose document is applied (i.e., an "application target"). A program that is an application target may be a software product manufactured in a distributable form, for example, an application that may be downloaded from an application store, a solution that may be installed through an installation file, and the like. Hereinafter, a target to which the purpose document is applied may be described using a program to which a unique identifier (e.g., programId) is given as an example.

The provider should obtain consent to the purpose document from the user, and manage various information such as in which program, when, and what consent the user has made. Further, if the purpose document is changed, the provider should newly obtain consent from the user. When the provider manages a large number and various types of programs, it may become difficult to manage purpose documents and user consent information. For example, if the management of the purpose document and consent information for each application distributed by a company is performed by separate entities (e.g., departments, divisions, etc.), the types of the purpose document and the format of consent information managed in a company may vary. Moreover, when an application is distributed in various countries, since the purpose document also should be prepared and translated corresponding to the country, multiple purpose documents may be individually prepared by a regional representative. As a result, several translated documents of the purpose document may be made in a same language area.

In order to address these and other problems, examples of the present disclosure provide a method and a system for managing various purpose documents and user consents.

Examples of the present disclosure provide a method and system for managing reference purpose documents as a pool, obtaining a purpose document required by each program from the purpose document pool, and generating user consent information to be provided to users of each program.

Examples of the present disclosure provide a method and system for generating user consent information for each user of a program and managing the state of the user consent information as a consent (e.g., OptedIn) state, a request for re-consent (e.g., ReOptedInRequired) state, or a withdrawal (e.g., OptedOut) state.

Examples of the present disclosure provide a method and system for storing a process action of user consent for a purpose document as a history.

Hereinafter, examples of a method and system for managing user consent for a purpose document will be described.

Figure 2:
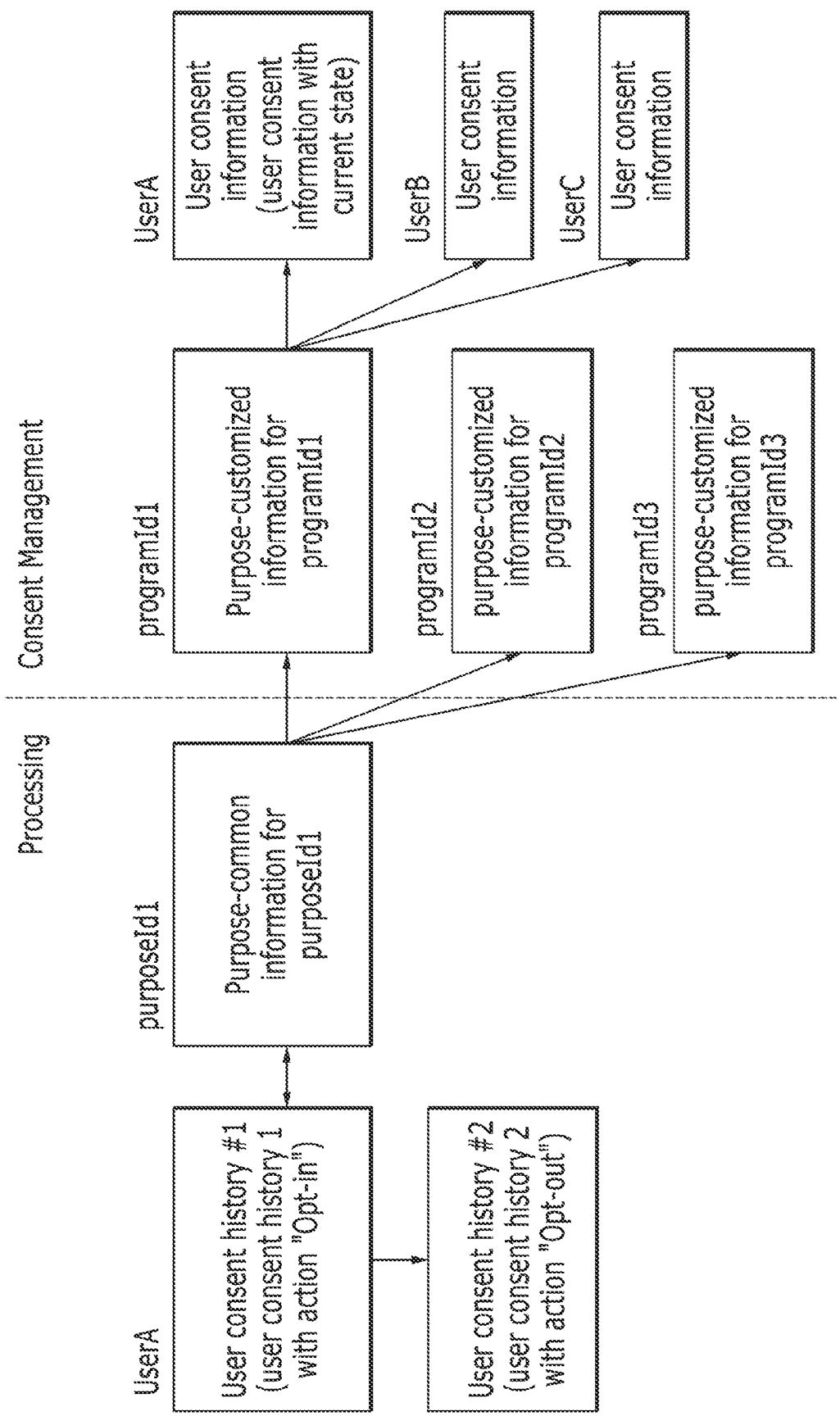
FIG. 2 is a diagram illustrating a relationship between a purpose document and user consent managed according to an example.

FIG. 1 is a diagram illustrating a system for managing a purpose document and user consent according to an example. FIG. 2 is a diagram illustrating a relationship between a purpose document and user consent managed according to an example.

Referring to FIG. 1, a provider providing a program and/or service to a user should notify the user of a purpose document such as a terms and conditions document, a software user license agreement, a personal information processing policy, and the like, and should manage corresponding user consent information. Here, the provider may manage various types of purpose documents, and the purpose documents may be prepared in various languages. Further, the provider should obtain user consent for a purpose document from the user. However, the purpose documents may differ for each of the provided programs or offering services. In addition, if the purpose document is modified, the user consent also should be updated (e.g., re-obtained).

To manage the various types of purpose documents and user consents, a purpose and consent management system 10 may manage the purpose documents, generate user consent information that is provided to the user based on a predetermined purpose document, and manage an acquired consent action as a history.

The purpose and consent management system 10 may include a purpose document management server 100, a cloud server 200 to interwork with the purpose document management server 100, and a service server 300 to interwork with the cloud server 200 and to exchange information with a terminal 400. An example operation within the purpose and consent management system 10 is described in which the purpose document management server 100, the cloud server 200, and the service server 300 are differentiated from each other. However, the purpose and consent management system 10, the purpose document management server 100, the cloud server 200, and the service server 300 may be implemented in an integrated way or a distributed way. Also, a name of an illustrated component (e.g., a server) is given only for explanation, and a function of the component is not limited by the name.

The terminal 400 may include a computing device that can access the service server 300 via a network. In an example, the terminal 400 may be a laptop, a mobile terminal, or any of various devices including a printer device. In the terminal 400, a program to which the purpose document is applied is installed. Consent to the purpose document may be obtained to use the program. To this end, the program installed in the terminal 400 may transmit identification information such as a program identifier (e.g., programId) and a user identifier/device identifier to the service server 300, display the user consent information received from the service server 300 on a screen, and receive a user action (e.g., acceptance) in response to the displayed contents. If the user wants to use an offering service added to the program, a separate consent to the purpose document may be obtained. At this time, an offering service identifier may be transmitted to the service server 300 along with the program identifier.

Through a login process related to the executed program, the terminal 400 may obtain a token including a user identifier or a token available for receiving a user identifier from a predetermined device. The purpose document management server 100, the cloud server 200, and the service server 300 may identify a user by exchanging tokens transmitted from the terminal 400. In various examples, it is assumed that the servers can identify the user via the token included in the exchanged information.

The purpose document management server 100 may register a purpose document such as a terms and conditions document, an EULA, a personal information processing policy, and the like, and manage purpose document. The purpose document management server 100 may provide information to other servers. In certain examples, the information provided to other servers may include legally required information. The purpose document management server 100 may manage various types and versions of purpose documents and purpose documents written in various languages in a pool. The purpose document management server 100 may manage a consent history for the purpose document.

The purpose document management server 100 may register the purpose document and generate purpose-common information including an identifier (e.g., purposeId) and properties of each of the registered purpose documents. The purpose document management server 100 may register common information of purpose documents and manage generation of a purpose document dedicated to a program or an offering service provided to a user based on the purpose-common information.

When a program or an offering service is registered as an application target of the purpose document, the cloud server 200 may obtain purpose-common information required by the application target from the purpose document management server 100. The application target of the purpose document is distinguished with an identifier such as "programId," "originId," etc., which will be described below. Upon registering the application target, a corresponding purpose document identifier (e.g., purposeId) registered in the purpose document management server 100 may be input. Alternatively, when the application target is registered, the cloud server 200 may extract a purpose document corresponding to the application target according to a policy and may map the purpose document to the application target.

The cloud server 200 may generate purpose-customized information dedicated to the application target by combining the obtained purpose-common information with the information of the application target.

The cloud server 200 may generate user consent information by combining user information and the purpose-customized information. The user consent information may be provided to the terminal 400 via the service server 300, and a state thereof may be updated according to a user action input in the terminal 400. Further, the user consent information may be updated to a re-consent request state (e.g., ReOptedInRequired), if re-consent is to be obtained due to an update of the purpose document. The cloud server 200 may manage the user consent information of the current state and provide the user consent information of the current state to the terminal 400.

In an example, when the user consent information is updated by a user's action, the cloud server 200 may inform the purpose document management server 100 of the updated information. As a result, the purpose document management server 100 may manage a user consent history for the purpose document.

Referring to FIG. 2, the purpose-common information and a user consent history may be managed for processing. For consent management, the purpose-customized information and the user consent information may be managed. Based on the purpose-common information of a single purpose document (e.g., purposeId1), purpose-customized information for each application target (e.g., programId1, programId2, and programId3) may be generated. User consent information of each user (e.g., UserA, UserB, UserC) may be generated from each of the purpose-customized information. In various examples, a state of the user consent information may be changed according to a user action or an update of the purpose document, and a current state may be recorded.

The user consent history may record user actions for the user consent information. For example, information regarding user consent (e.g., opt-in) or withdrawal (e.g., opt-out) may be recorded overtime.

The purpose-common information may be generated for each purpose document to which an identifier (e.g., purposeId) is given. For example, the purpose-common information may include an identifier (e.g., purposeId) and properties of the purpose document as shown in Table 1. The term "requiredIdentifiers" refers to an identification used to identify who has consented to the purpose document. In an example, an email address of a user or a device

TABLE 1

| Property | Description |
| --- | --- |
| purposeId | Identifier of purpose document (e.g., test.email.test) |
| organization | Name of organization that registered the purpose document (e.g., HP) |
| processingBasis | Processing criteria of purpose document (e.g., consent) |
| requiredIdentifiers | Identification means required in purpose document, information of identification means required during opt-in/opt-out (e.g., email/deviceId) |

TABLE 1-continued

| Property | Description |
| --- | --- |
| verbiage: | |
| locale | Language in which purpose document is written |
| version | Version of purpose document |
| minVersion | Minimum compatible version |
| statement | Content of purpose document (e.g., English: email-related consent request, v1) |
| reference | Reference address |

When a user action of changing the user consent information is performed, user consent history may be generated and may include date and time information of the user's consent to or withdrawal from the purpose document and a consent process action. The user consent history may include, for example, information as shown in Table 2.

In Table 2, the term "clientId" refers to a public identifier of a program. The "clientId" may be included in a token transmitted from the terminal 400 executing the program. The term "dataSubject" refers to user or device identification information that is obtained according to the identification used in the purpose document and may include an email address or a device identifier. The identification information described in "dataSubject" may include a name, an address, a telephone number, employee information (e.g., employee number), a unique number of a user account, and the like, besides an email address.

TABLE 2

| Property | Description |
| --- | --- |
| purposeId | Purpose document identifier (e.g., test.email.test) |
| organization | Name of organization that registered the purpose document (e.g., HP) |
| transactionId | User consent processing identifier |
| transactionDate | User consent processing date and time |
| action | User consent processing action (e.g., opt-in/opt-out) |
| clientId | Public identifier of program that generated user consent information |
| dataSubject | User/device identification information obtained according to required identification means (requiredIdentifiers) in the purpose document |
| verbiage: | |
| locale | Language in which purpose document is written |
| version | Version of purpose document |
| custom | Special field |

The purpose-customized information may be generated for each application target of the purpose document. The purpose-customized information may include, for example, information obtained by combining purpose document information with information of an application target, as shown in Table 3. The term "resourceId" refers to an identifier given to the purpose-customized information that is generated for consent management, the term "purposeId" refers to an identifier of the purpose document, and the term "programId" refers to an identifier of the program to which the purpose document is applied. The term "originType" is used for indicating whether an origin of the application target is a program or an offering service. The term "originId" refers to an origin identifier. If "originType" is a program, "originId" and "programId" are equal. If "originType" is an offering service, "originId" may be an identifier of the offering service and "programId" may be an identifier of the program to which the offering service belongs. The term "tenantId" refers to an identifier of a group to which the purpose-customization information of the application target belongs, and may indicate a certain rental resource space (e.g., tenancy) of a cloud platform where data corresponding to "resourceId" is stored.

TABLE 3

| Property | Description |
| --- | --- |
| resourceId | Identifier of purpose-customized information |
| tenantId | Identifier of tenant to which purpose-customized information belongs |
| state | State of purpose-customized information |
| purposeId | Identifier of purpose document |
| version | Version of purpose document |
| verbiageType | Type of purpose document (e.g., Text/URL) |
| verbiageValue | Content of purpose document (e.g., text document/address where the document is stored) |
| verbiageLocale | Language in which purpose document is written |
| processingBasis | Processing criteria of purpose document (e.g., consent) |
| requiredIdentifierList | Identification means required in the purpose document, user identification means required at opt-in/opt-out (e.g., email/deviceId) |
| originType | Type of origin (e.g., program/offering) |
| originId | Identifier of Origin |
| programId | Identifier of program to which origin belongs |

The user consent information is generated for each user or device and may include a current state. The user consent information may include, for example, information shown in Table 4. The state of the user consent information may be defined as shown in Table 5. The term "resourceId" refers to an identifier assigned to the user consent information that is generated for consent management, the term "purposeId" refers to an identifier of the purpose document, and the term "purposeresourceId" refers to an identifier of the purpose-customized information. The term "tenantId" refers to an identifier of a group to which the user consent information belongs and may refer to a certain rental resource space (e.g., tenancy) of a cloud platform where data corresponding to "resourceId" is stored. The term "userResourceId" refers to a user identifier. The term "userResourceId" may refer to information included in a token or information obtained from a predetermined device by using the token. The term "deviceId" refers to a device identifier and may be used when managing consent information without user authentication through login. The term "deviceId" generally refers to a serial number of a device such as a mobile terminal or a printer device, and in some cases an identifier of a program installed in the device may be used as the "deviceId." The term "deviceId" may be an identifier that is not user identification information.

TABLE 4

| Property | Description |
| --- | --- |
| resourceId | Identifier of user consent information |
| tenantId | Identifier of tenant to which user consent information belongs |
| state | State (NoSelection, OptedIn, OptedOut, ReOptedInRequired) |
| purposeId | Identifier of purpose document |
| purposeresourceId | Identifier of purpose-customized information |
| purposeVersion | Version of purpose document |
| originType | Type of origin |
| originId | Identifier of origin |
| programId | Identifier of program to which origin belongs |
| verbiageType | Type of purpose document (e.g., Text/URL) |
| verbiageValue | Content of purpose document (e.g., text document/address where the document is stored) |

TABLE 4-continued

| Property | Description |
| --- | --- |
| verbiageLocale | Language in which purpose document is written |
| userResourceId | User identifier, if user consent is related to user information |
| deviceId | Device identifier, if user consent is related to a device |
| dateTime | Date and time of change |

TABLE 5

| State | Description |
| --- | --- |
| NoSelection | Initial state of user consent information when initially generated, or state without expression of user's intention |
| OptedIn(Consent) | State where an agreement is done to user consent information |
| OptedOut(Withdraw) | State where withdrawal (opt-out) of user consent information |
| ReOptedInRequired (re-consent request) | State where re-consent to user consent information is requested |

Hereinafter, an example method in which a purpose and consent management system manages a purpose document and user consent will be described with reference to the accompanying drawings.

Figure 3:
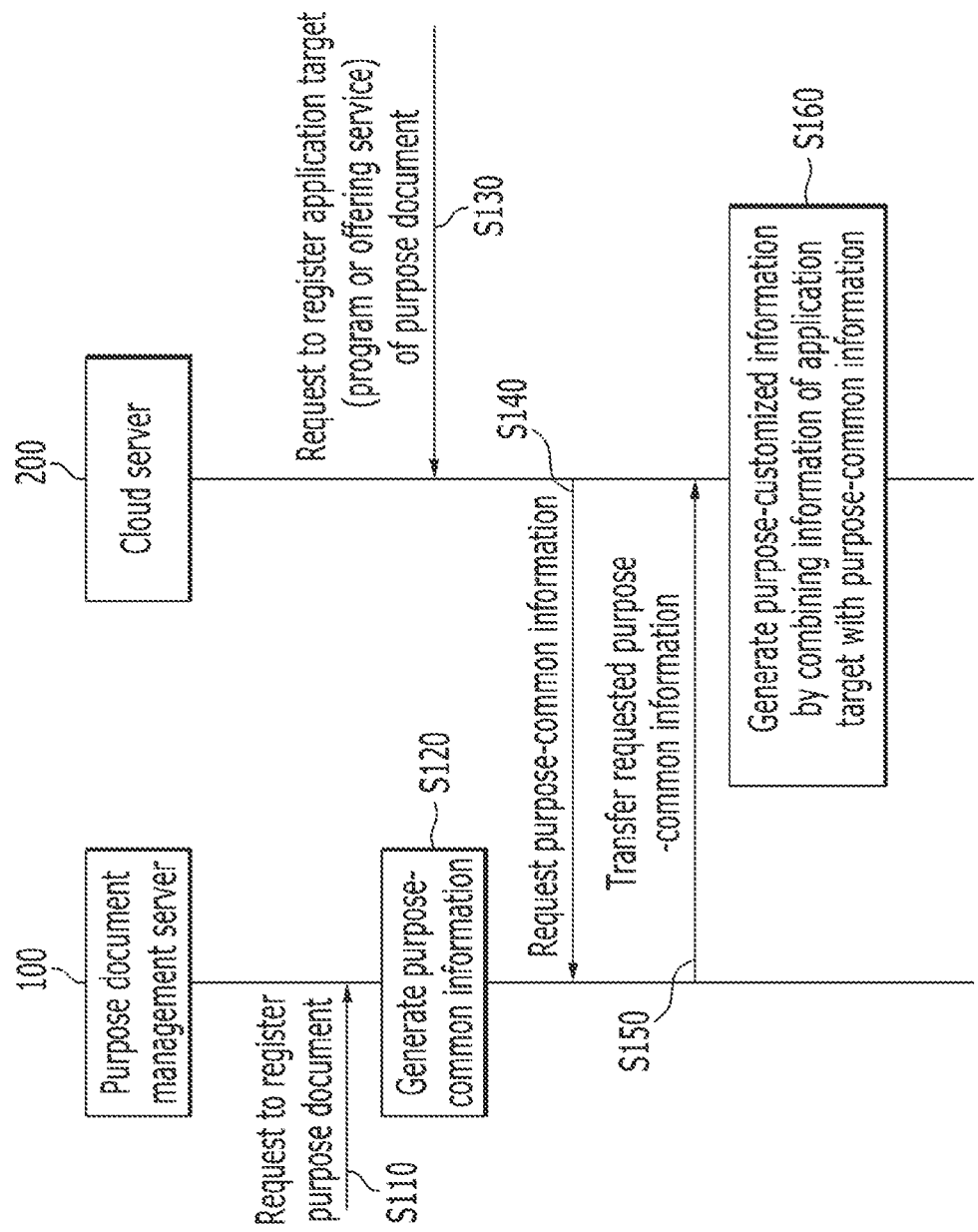
FIG. 3 is a flowchart showing a method for generating information of a purpose document according to an example.

FIG. 3 is a flowchart showing a method for generating information of a purpose document according to an example.

Referring to FIG. 3, the purpose document management server 100 may receive a registration request for a purpose document at operation S110. The registration request may include information required to generate purpose-common information as shown in Table 1 and may include, for example, information such as a language in which the purpose document is written, a version of the purpose document, a minimum compatible version, content of the purpose document, a reference address of the purpose document, and the like.

The purpose document management server 100 may generate the purpose-common information based on the registration request for the purpose document at operation S120. The purpose document management server 100 may generate purpose-common information of the purpose document (e.g., purposeId="test.email.test") as shown in Table 6 according to the properties described in Table 1.

TABLE 6

```
{
   "purposeId": "test.email.test,"
   "verbiage": {
      "locale": "en,"
      "version": "1,"
      "statement": "English: email-related consent request, v1,"
      "minVersion": "1,"
      "reference":, "https://www.doc.com/doc.pdf"
   },
   "organization": "HP,"
   "processingBasis": "consent,"
   "requiredIdentifiers": "email"
}
```

The cloud server 200 may receive a registration request for an application target of the purpose document (e.g., a program or offering service) at operation S130. The registration request may include a purpose document identifier (e.g., purposeId="test.email test") previously registered in the purpose document management server 100. The registration request may include a program identifier (e.g., programId) of the application target. When the application target is an offering service of the program, the registration request may further include an identifier (e.g., "originId") of the offering service and whose "originType" is "offering."

The cloud server 200 may request the purpose-common information of the purpose document identifier (e.g., purposeId="test.email.test") included in the registration request to the purpose document management server 100 at operation S140.

The purpose document management server 100 may transmit the requested purpose-common information to the cloud server 200 at operation S150. The cloud server 200 may receive the purpose-common information prepared as shown in Table 6.

The cloud server 200 may generate purpose-customized information for the application target by combining information of the application target with the obtained purpose-common information at operation S160. The cloud server 200 may generate the purpose-customized information of the program as shown in Table 7 according to the properties described in Table 3.

TABLE 7

{
  "resourceId": "5eb9040b270f533ae13e5e7e,"
  "tenantId": "c1a46987-cbd3-45db-b94a-a6544116fc2d,"
  "state": "New,"
  "purposeId": "test.email.test,"
  "version": "1,"
  "verbiageType": "Text,"
  "verbiageValue": "English: email-related consent request, v1,"
  "verbiageLocale": "en,"
  "originType": "Program,"
  "originId": "11a0acf2-935c-11ea-bb37-0242ac130002,"
  "programId": "11a0acf2-935c-11ea-bb37-0242ac130002,"
  "requiredIDentifierList": [
    "email"
  ]
}

The cloud server 200 may manage the purpose-customized information generated for each application target and may generate consent information for each user by using the purpose-customized information.

Figure 4:
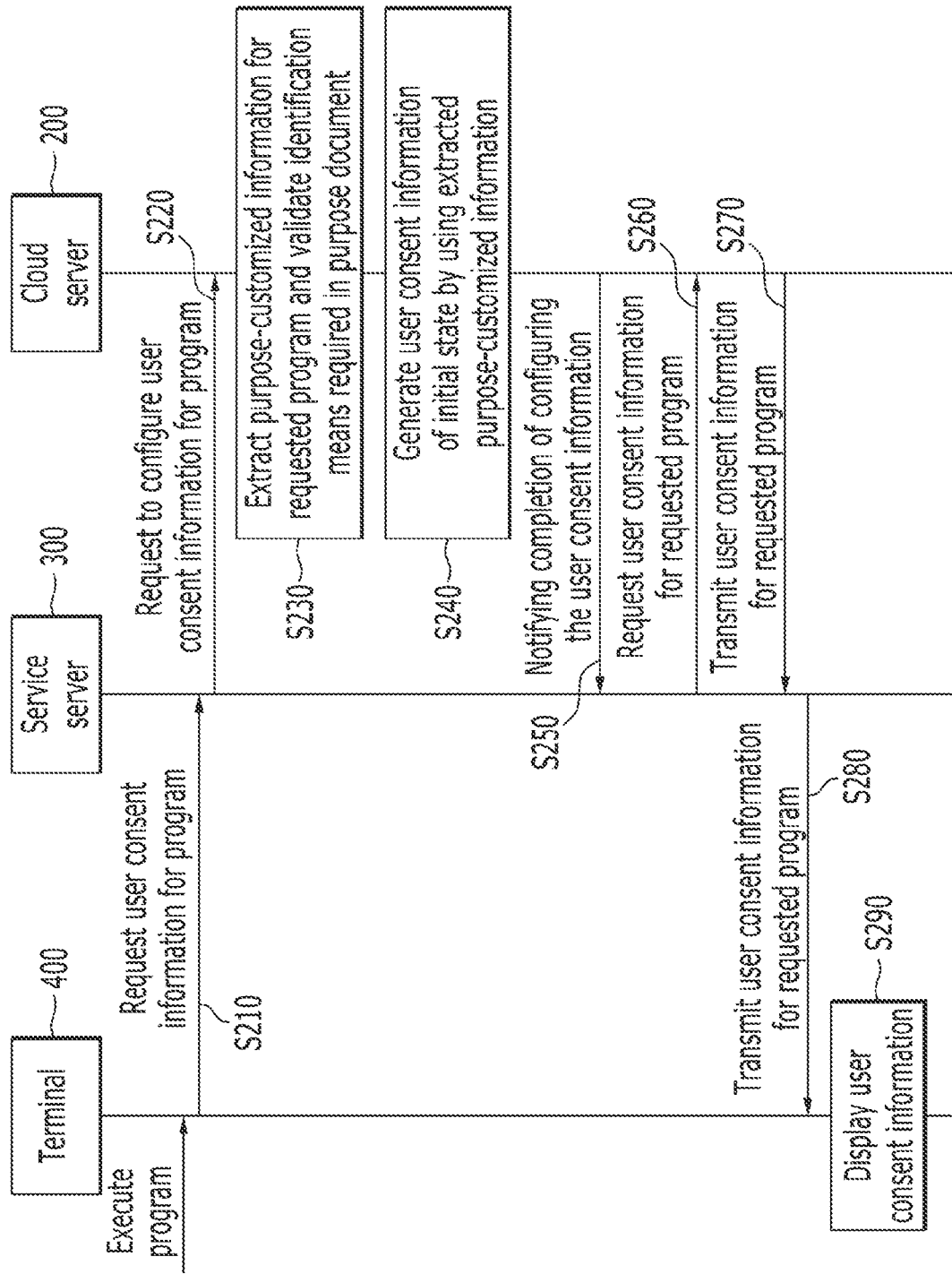
FIG. 4 is a flowchart showing a method for configuring user consent information according to an example.

FIG. 4 is a flowchart showing a method for configuring user consent information according to an example.

Referring to FIG. 4, when a user executes a program, a terminal 400 may request user consent information for the corresponding program to a service server 300 at operation S210. For example, the request may include a program identifier (e.g., programId="11a0acf2-935c-11ea-bb37-0242ac130002") and user identification information.

The service server 300 may transmit a request to configure user consent information for the requested program to a cloud server 200 at operation S220. The service server 300 may manage a history showing the user consent information generated in the cloud server 200 and may thereby determine whether the configuration is necessary.

The cloud server 200 may extract the purpose-customized information of the requested program and collect and validate an identification means (e.g., requiredIdentifierList) required in the purpose document at operation S230. When the identification means included in the purpose-customized information is an e-mail, the cloud server 200 may obtain the e-mail from the terminal 400 and validate the obtained e-mail through interworking with an authentication server (not shown).

The cloud server 200 may generate user consent information of an initial state by using the extracted purpose-customized information at operation S240. According to the properties described in Table 4, the cloud server 200 may generate the user consent information whose state is not-selected (e.g., NoSelection) as shown in Table 8. In Table 8, the term "userResourceId" refers to user identification information and may be confirmed via a token issued by the authentication server.

TABLE 8

{
  "resourceId": "5ec6a1f108dca55b4db43bea,"
  "tenantId": "c1a46987-cbd3-45db-b94a-a6544116fc2d,"
  "state": "NoSelection,"
  "purposeId": "test.email.test,"
  "purposeResourceId": "5eb9040b270f533ae13e5e7e,"
  "purposeVersion": "1,"
  "originType": "Program,"
  "originId": "11a0acf2-935c-11ea-bb37-0242ac130002,"
  "verbiageType": "Text,"
  "verbiageValue": "English: email-related consent request, V1,"
  "verbiageLocale": "en,"
  "userResourceId": "5ec5dafedb3e470006de85d6,"
  "dateTime": "0000"
}

The cloud server 200 may notify as a response to the request, completion of configuring the user consent information to the service server 300 at operation S250.

The service server 300 may request the user consent information for the requested program to the cloud server 200 at operation S260. In an example, the service server 300 may request the user consent information whose state is not-selected (e.g., NoSelection) or re-consent request (e.g., ReOptedInRequired).

The cloud server 200 may transmit user consent information for the requested program to the service server 300 at operation S270. The user consent information for the requested program may be user consent information generated with resourceId="5ec6a1f108dca55b4db43bea."

The service server 300 may transmit the requested user consent information to the terminal 400 at operation S280.

The terminal 400 may display the user consent information at operation S290. The terminal 400 may display the content of the purpose document (e.g., "test.email.test") included in the user consent information on a screen, and may provide an interface through which the user may choose to agree or disagree. The user consent information may be provided to choose to agree all or disagree all or may be provided to choose to agree or disagree by item.

Figure 5:
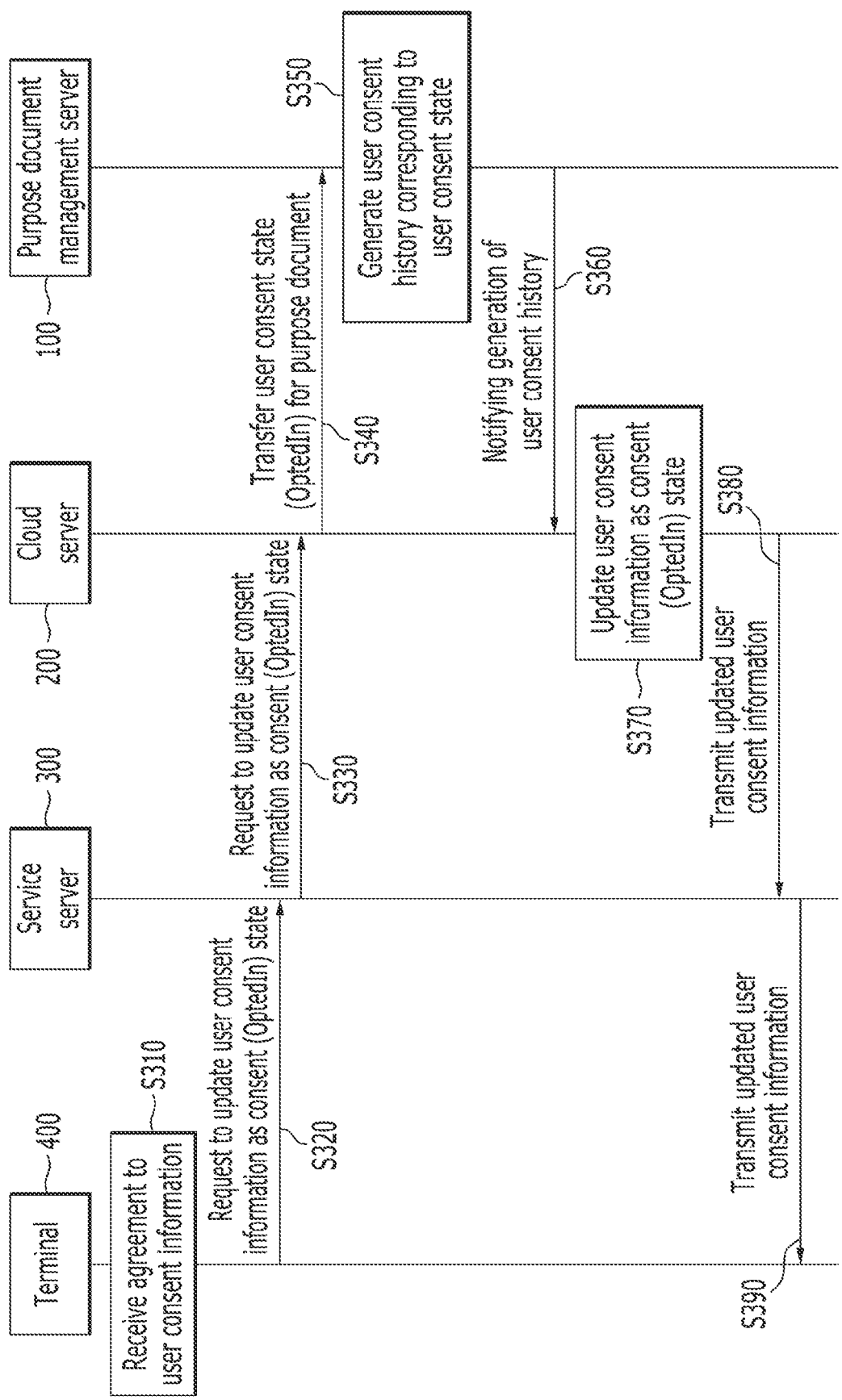
FIG. 5 is a flowchart showing a method for storing user consent information according to an example.

FIG. 5 is a flowchart showing a method for storing user consent information according to an example.

Referring to FIG. 5, terminal 400 may receive an agreement (e.g., OptedIn) for the user consent information from a user at operation S310. The term "OptedIn" refers to a state where the user has agreed (e.g., consented) to the user consent information.

The terminal 400 may transmit to the service server 300 a request to update the user consent information (e.g., resourceId="5ec6a1f108dca55b4db43bea") as a consent (e.g., OptedIn) state at operation S320.

The service server 300 may transmit to the cloud server 200 a request to update the user consent information (e.g., resourceId="5ec6a1f108dca55b4db43bea") as the consent (e.g., OptedIn) state at operation S330.

The cloud server 200 may confirm the purpose document (e.g., purposeId="test.email.test") related to the user consent information requested to be updated, and transfer the user consent state (e.g., OptedIn) for the purpose document to the purpose document management server 100 at operation S340. The cloud server 200 may identify the purpose document from the purpose document identifier (e.g., purposeId) included in updated user consent information.

The purpose document management server 100 may generate a user consent history corresponding to the user consent state at operation S350. According to the properties described in Table 2, the purpose document management server 100 may generate a user consent history where the user consent processing action is to consent (e.g., opt-in). The purpose document management server 100 may receive information constituting the user consent history from the cloud server 200. The user consent history may include a purpose document identifier (e.g., purposeId), a user consent processing action therefor, a user consent process identifier (e.g., transactionId), a process date and time (e.g., transactionDate), and the like. Further, the user consent history may include information (e.g., dataSubject) obtained according to an identification means (e.g., requiredIdentifiers) required in the purpose document, a public identifier (e.g., clientId) of the program that generates the user consent information, and the like.

The cloud server 200 may transmit the updated user consent information to the service server 300 at operation S380.

The service server 300 may transmit the updated user consent information to the terminal 400 at operation S390. Thereafter, the terminal 400 may display the updated user consent information.

Figure 6:
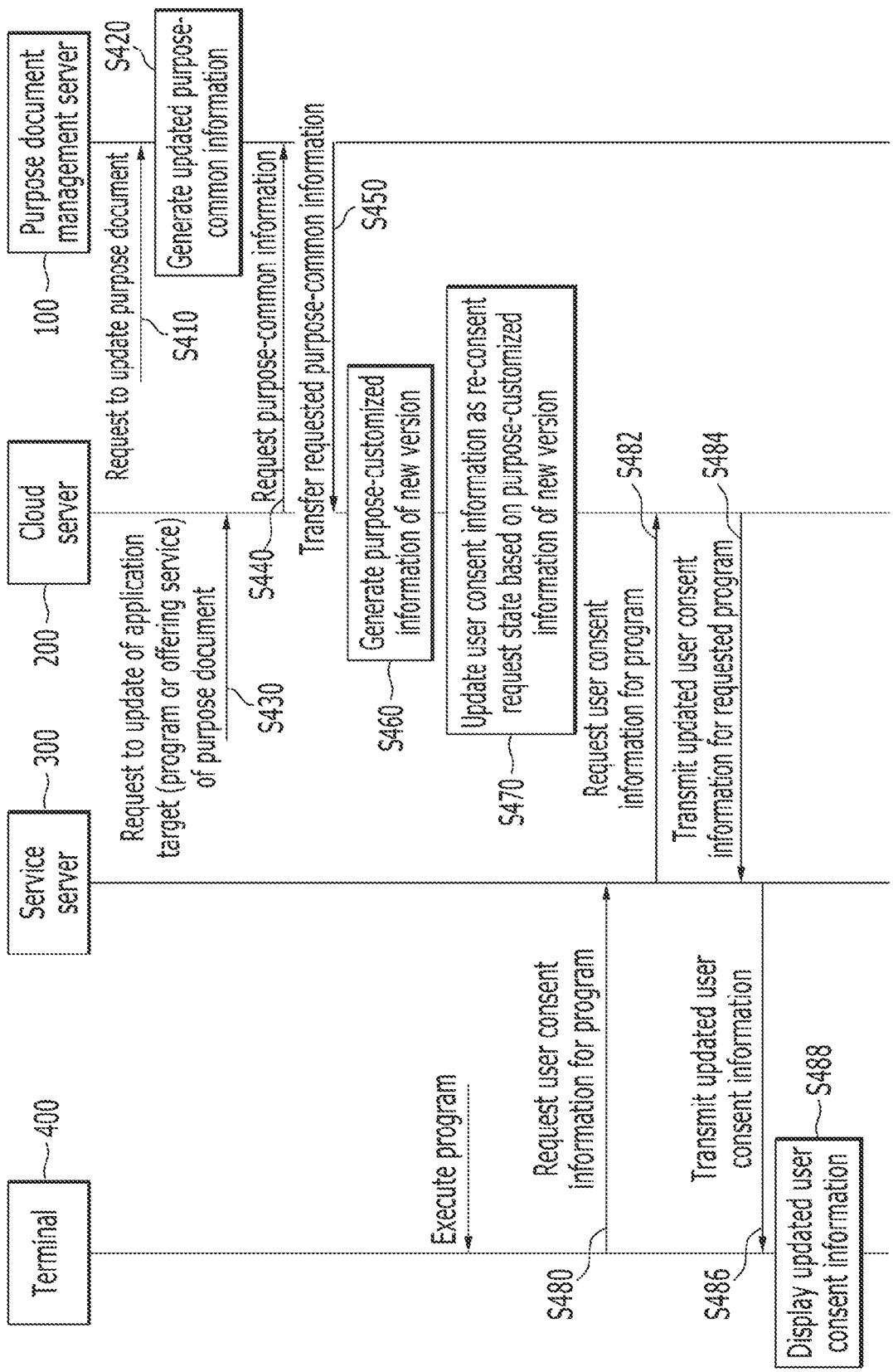
FIG. 6 is a flowchart showing a method for re-obtaining user consent information according to an example.

FIG. 6 is a flowchart showing a method for re-obtaining user consent information according to an example.

Referring to FIG. 6, the purpose document management server 100 may receive an update request for a purpose document (e.g., purposeId="test.email.test") at operation S410. The update request may include information for generating updated purpose-common information.

The purpose document management server 100 may generate the updated purpose-common information based on the update request of the purpose document at operation S420. The purpose document management server 100 may update Table 6, which is the purpose-common information of the purpose document (e.g., purposeId="test.email test"), as Table 11. In the purpose-common information, a version, content (e.g., statement), and a minimum compatible version

TABLE 9

```
{
  "purposeId": "test.email.test,"
  "action": "opt-in,"
  "transactionDate":
  "2020-05-18T02:12:20.729Z,"
  "transactionId": "78d7b6ba-0fdc-4d9c-9b7d-662e5e3fe2f1,"
  "clientId": "HejNX6ID6acXI8exgqFugPTRGrSTU3np,"
  "dataSubject": {
     "email": "ucde.owner.01@gmail.com"
  },
  "organization": "HP,"
  "verbiage": {
     "locale": "en,"
     "version": "1,"
     "custom":
  "{\"hpidUserResourceId\":\"ne5gbqked1qj1iufz3z9zpnrycur1q8p\",\"stratusUserR
  esourceId\":\" 5ec5dafedb3e470006de85d6\"}"
  }
}
```

The purpose document management server 100 may notify the generation of the user consent history to the cloud server 200 at operation S360.

The cloud server 200 may update the user consent information as the consent (e.g., OptedIn) state at operation S370. The cloud server 200 may update the user consent information of Table 8 as shown in Table 10, to maintain the latest user consent information.

TABLE 10

```
{
  "resourceId": "5ec6a1f108dca55b4db43bea,"
  "tenantId": "c1a46987-cbd3-45db-b94a-a6544116fc2d,"
  "state": "OptedIn,"
  "purposeId": "test.email.test,"
  "purposeResourceId": "5eb9040b270f533ae13e5e7e,"
  "purposeVersion": "1,"
  "originType": "Program,"
  "originId": "11a0acf2-935c-11ea-bb37-0242ac130002,"
  "verbiageType": "Text,"
  "verbiageValue": "English: email-related consent request,
  V1,"
  "verbiageLocale": "en,"
  "userResourceId": "5ec5dafedb3e470006de85d6,"
  "dateTime": "0000"
}
``` of the purpose document may be changed. Since the compatible version is the current version, re-consent to the purpose document is required. If the minimum compatible version is a previous version, a re-consent request may not be made to the user because the user has already consented to the previous version.

TABLE 11

```
{
  "purposeId": "test.email.test,"
  "verbiage": {
     "locale": "en,"
     "version": "2,"
     "statement": "English: email-related consent request,
  v2,"
     "minVersion": "2,"
     "reference":, "https://www.doc.com/doc.pdf"
  },
  "organization": "HP,"
  "processingBasis": "consent,"
  "requiredIdentifiers": "email"
}
```

Since the purpose document is updated, the cloud server 200 may also receive an update request for an application target (e.g., program or offering service) at operation S430. The update request for the application target may include a program identifier (e.g., programId="11a0acf2-935c-11ea-bb37-0242ac130002") and an identifier of the purpose document (e.g., purposeId="test.email.test"). When the application target is an offering service, an origin identifier (e.g., originId) different from a program identifier may be further included. Alternatively, the cloud server 200 may receive the updated purpose document from the purpose document management server 100, extract the application target related to the updated purpose document, and perform a consent update process for the extracted application target.

The cloud server 200 may request the purpose-common information of the purpose document identifier included in the update request to the purpose document management server 100 at operation S440.

The cloud server 200 may receive the updated purpose-common information from the purpose document management server 100 at operation S450. The cloud server 200 may receive the updated purpose-common information as shown in Table 11.

The cloud server 200 may generate a new version of purpose-customized information for the application target by using the updated purpose-common information at operation S460. For example, the cloud server 200 may generate the new version of the purpose-customized information to which a new identifier (e.g., resourceId="5eb9040b270f533ae13e5e8f") is given as shown in Table 12, based on the updated purpose-common information. The purpose-customized information may include an updated version and updated statement (e.g., verbiageValue) of the purpose document, and the state of the purpose-customized information may be a state of an updated consent request (e.g., UpdateOptInRequired) state. At this time, the purpose-customized information of the previous version generated as shown in Table 7 may be changed to an update state and stored.

TABLE 12

{
"resourceId": "5eb9040b270f533ae13e5e8f,"
"tenantId": "c1a46987-cbd3-45db-b94a-a6544116fc2d,"
"state": " UpdatedOptInRequired,"
"purposeId": "test.email.test,"
"version": "2,"
"verbiageType": "Text,"
"verbiageValue": "English: email-related consent request, v2,"
"verbiageLocale": "en,"
"originType": "Program,"
"originId": "11a0acf2-935c-11ea-bb37-0242ac130002,"
"programId": "11a0acf2-935c-11ea-bb37-0242ac130002,"
"requiredIdentifierList": [
    "email"
]
}

Here, in the purpose-customized information of the new version, the compatible version required in the purpose document is the latest version. Thus, the cloud server 200 may update the user consent information generated with the purpose-customized information of the previous version as a re-consent request (e.g., ReOptedInRequired) at operation S470. The cloud server 200 updates the user consent information shown in Table 10 as Table 13 and changes the state to the re-consent request (e.g., ReOptedInRequired) state. At this time, the user consent information has an identifier (e.g., purposeResourceId) given to the new version of the purpose-customized information. In addition, the user consent information may include an updated version and updated statement (e.g., verbiageValue) of the purpose document.

TABLE 13

{
"resourceId": "5ec6a1f108dca55b4db43bea,"
"tenantId": "c1a46987-cbd3-45db-b94a-a6544116fc2d,"
"state": "ReOptedInRequired,"
"purposeId": "test.email.test,"
"purposeResourceId": "5eb9040b270f533ae13e5e8f,"
"purposeVersion": "2,"
"originType": "Program,"
"originId": "11a0acf2-935c-11ea-bb37-0242ac130002,"
"verbiageType": "Text,"
"verbiageValue": "English: email-related consent request, v2,"
"verbiageLocale": "en,"
"userResourceId": "5ec5dafedb3e470006de85d6,"
"dateTime": "0000"
}

Thereafter, the terminal 400 may receive the new version of the user consent information via the service server 300.

For example, when the program is executed, the terminal 400 may request user consent information of the corresponding program to the service server 300 at operation S480. For example, the request may include a program identifier (e.g., programId="11a0acf2-935c-11ea-bb37-0242ac130002") and user identification information.

Since the user consent information is configured, the service server 300 may request the user consent information of the requested program to the cloud server 200 at operation S482. Here, the service server 300 may request the user consent information of a not-selected (e.g., NoSelection) state or a re-consent request (e.g., ReOptedInRequired) state.

The cloud server 200 may transmit the updated user consent information for the requested program to the service server 300 at operation S484. The user consent information of the requested program may be the updated user consent information (e.g., resourceId="5ec6a1f108dca55b4db43bea") as shown in Table 13.

The service server 300 may transmit the updated user consent information to the terminal 400 at operation S486.

The terminal 400 may display the updated user consent information at operation S488. As described in FIG. 5, when an agreement to the user consent information is input, the cloud server 200 may update the user consent information of the state of ReOptedInRequired shown in Table 13, as OptedIn as shown in Table 14.

TABLE 14

{
"resourceId": "5ec6a1f108dca55b4db43bea,"
"tenantId": "c1a46987-cbd3-45db-b94a-a6544116fc2d,"
"state": "OptedIn,"
"purposeId": "test.email.test,"
"purposeResourceId": "5eb9040b270f533ae13e5e8f,"
"purposeVersion": "2,"
"originType": "Program,"
"originId": "11a0acf2-935c-11ea-bb37-0242ac130002,"
"verbiageType": "Text,"
"verbiageValue": "English: email-related consent request, v2,"
"verbiageLocale": "en,"
"userResourceId": "5ec5dafedb3e470006de85d6,"
"dateTime": "0000"
}

The cloud server 200 may transmit the consent (e.g., OptedIn) state input by the user to the purpose document (e.g., purposeId="test.email.test") to the purpose document management server 100. The cloud server 200 may transfer, to the purpose document management server 100, an email address and a public identifier (e.g., clientId) of a program that are obtained according to the identification means (e.g., requiredIdentifiers) required by the purpose documents. The purpose document management server 100 may generate a user consent history that records the user consent processing action, processing date and time, and the like for the new version of the purpose document.

Figure 7:
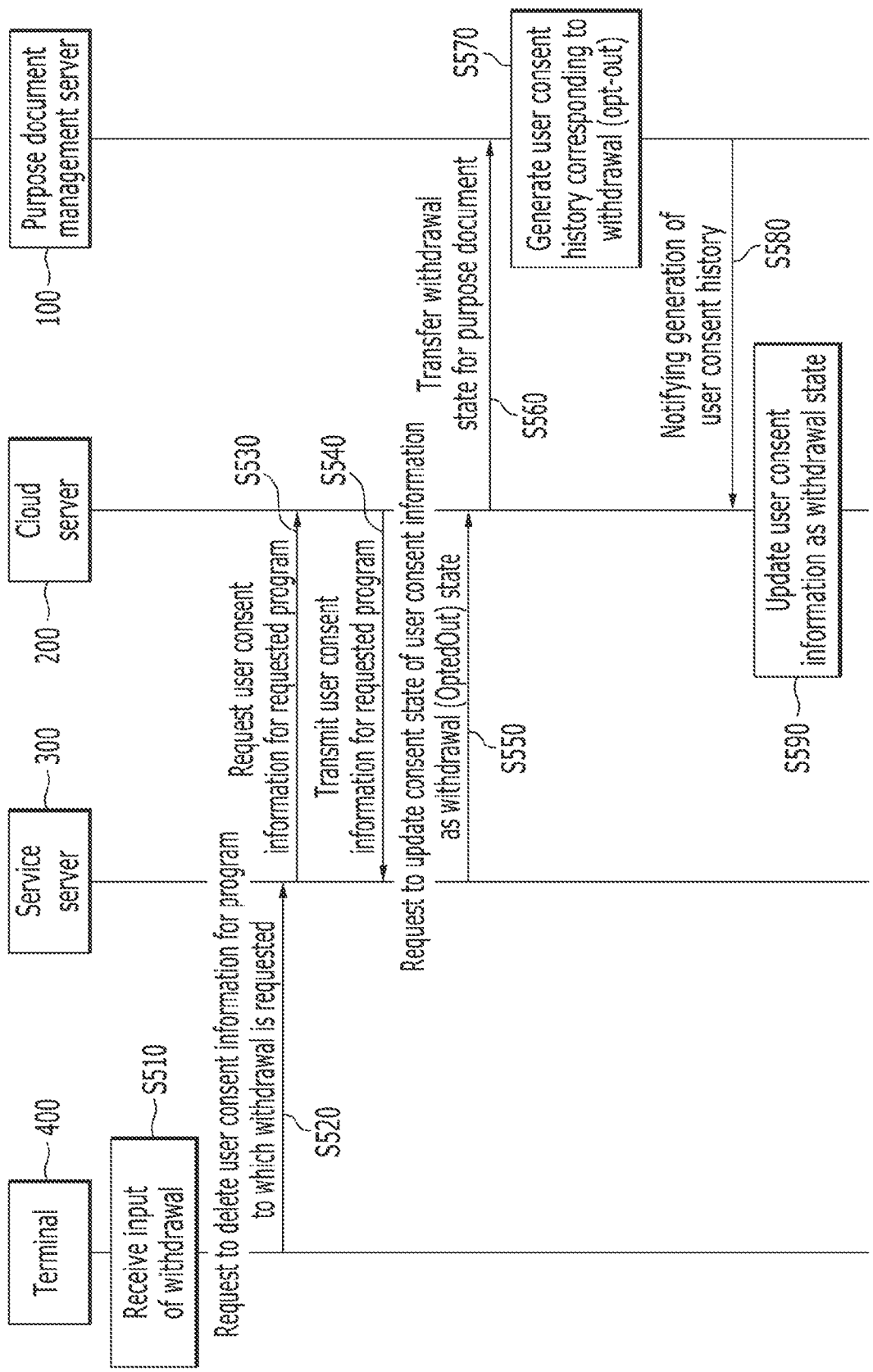
FIG. 7 is a flowchart showing a method for managing user consent information upon user withdrawal according to an example.

FIG. 7 is a flowchart showing a method for managing user consent information upon user withdrawal according to an example.

Referring to FIG. 7, the user may withdraw (e.g., Opted-Out) after having consented to the purpose document. In an example, the user consent information may be managed as follows.

The terminal 400 may receive an input of withdrawal from a program that is an application target of the purpose document at operation S510.

The terminal 400 may request the service server 300 to delete the user consent information for the program to which the withdrawal is requested at operation S520.

The service server 300 may request the user consent information for the requested program from the cloud server 200 at operation S530. Here, the service server 300 may request the user consent information of the consent (e.g., OptedIn) state.

The cloud server 200 may transmit the requested user consent information to the service server 300 at operation S540.

The service server 300 may request the cloud server 200 to update the state of user consent information as a withdrawal (e.g., OptedOut) state at operation S550.

The cloud server 200 may transmit to the purpose document management server 100 the information representing that the purpose document related to the user consent information requested for an update is changed to the withdrawal state at operation S560.

The purpose document management server 100 may generate a user consent history corresponding to withdrawal (e.g., opt-out) at operation S570. The purpose document management server 100 may generate a user consent history that records withdrawal (e.g., opt-out) for the purpose document (e.g., purposeId="test.email.test"), a processing date and time (e,g., transactionDate), and the like as shown in Table 15. From this user consent history, information that the user (e.g., email="ucde.owner.01@gmail.com") has withdrawn (e.g., action="opt-out") for the purpose document (e.g., purposeId="test.email.test") in the program (e.g., clientId="HejNX6ID6acXI8exgqFugPTRGrSTU3np") and the date and time of the withdrawal (e.g., transactionDate) may be identified.

TABLE 15

{
  "purposeId": "test.email.test,"
  "action": "opt-out,"
  "transactionDate": "2020-05-18T02:12:20.729Z,"
  "transactionId": "78d7b6ba-0fdc-4d9c-9b7d-662e5e3fe2f1,"
  "clientId": "HejNX6ID6acXI8exgqFugPTRGrSTU3np,"
  "dataSubject": {
    "email": "ucde.owner.01@gmail.com"
  },
  "organization": "HP,"
  "verbiage": {
    "locale": "en,"
    "version": "1,"
    "custom":
"{\"hpidUserResourceId\":\"ne5gbqked1qj1iufz3z9zpnrycur1q8p\","\"stratusUserResourceId\":\" 5ec5dafedb3e470006de85d6\"}"
  }
}

The purpose document management server 100 may notify the generation of the user consent history to the cloud server 200 at operation S580.

The cloud server 200 may update the user consent information as a withdrawal (e.g., OptedOut) state at operation S590, As shown in Table 16, the user consent information may be changed to the withdrawal (e.g., OptedOut) state.

TABLE 16

```
{
  "resourceId": "5ec6a1f108dca55b4db43bea,"
  "tenantId": "c1a46987-cbd3-45db-b94a-a6544116fc2d,"
  "state": "OptedOut,"
  "purposeId": "test.email.test,"
  "purposeResourceId": "5eb9040b270f533ae13e5e7e,"
  "purposeVersion": "1,"
  "originType": "Program,"
  "originId": "11a0acf2-935c-11ea-bb37-0242ac130002,"
  "verbiageType": "Text,"
  "verbiageValue": "English: email-related consent request, v1,"
  "verbiageLocale": "en,"
  "userResourceId": "5ec5dafedb3e470006de85d6,"
  "dateTime": "00000"
}
```

Figure 8:
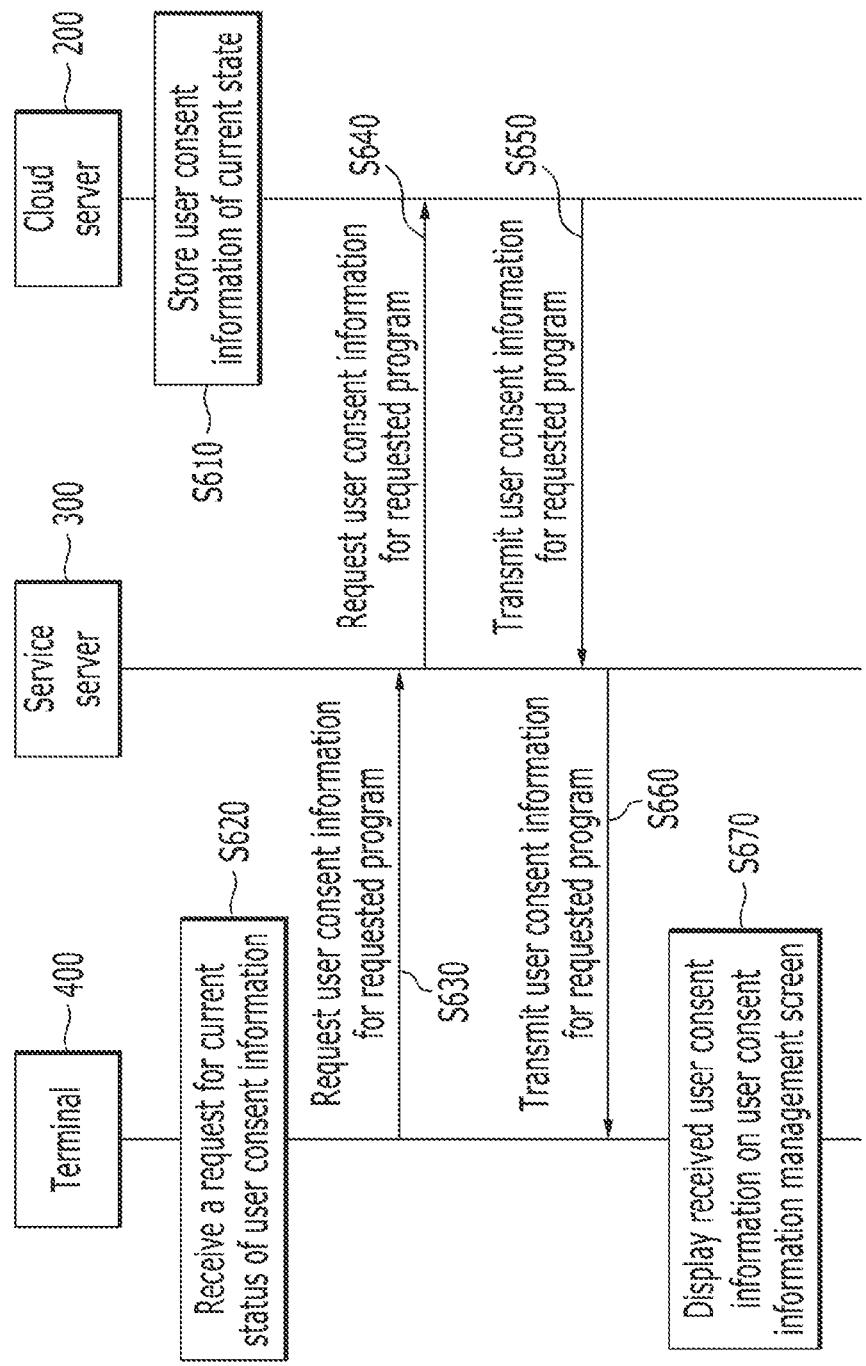
FIG. 8 is a flowchart showing a method for identifying user consent information according to an example.

FIG. 8 is a flowchart showing a method for identifying user consent information according to an example.

Referring to FIG. 8, the user may identify user consent information as follows.

The cloud server 200 may store user consent information of the current state at operation S610.

The terminal 400 may receive a request for a current status of the user consent information from the user consent information management screen of a program at operation S620.

The terminal 400 may request user consent information of the requested program from the service server 300 at operation S630. In an example, the user consent information in the consent (e.g., OptedIn) state may be requested.

The service server 300 may request the user consent information for the requested program from the cloud server 200 at operation S640.

The cloud server 200 may extract and transfer to the service server 300 the user consent information for the requested program at operation S8650. When separate user consent for an offering service of the program exists, the cloud server 200 may transfer the user consent information to the offering service to the service server 300.

The service server 300 may transmit the user consent information to the terminal 400 at operation S660.

The terminal 400 may display the received user consent information on the screen at operation S670. The terminal 400 may display, for example, the current status of the user consent information of the purpose document (e.g., test.email.test), as shown in Table 17.

TABLE 17

| Name | Content | Consent Date |
|---|---|---|
| test.email.test | English: email-related consent request, v1 | 2020 May 21 |

As described above, since the cloud server 200 maintains the user consent information as the latest user consent state, it is possible to provide the latest user consent information based on a user request. As a result, the user may easily identify the user consent information obtained through consent made by itself.

Figure 9:
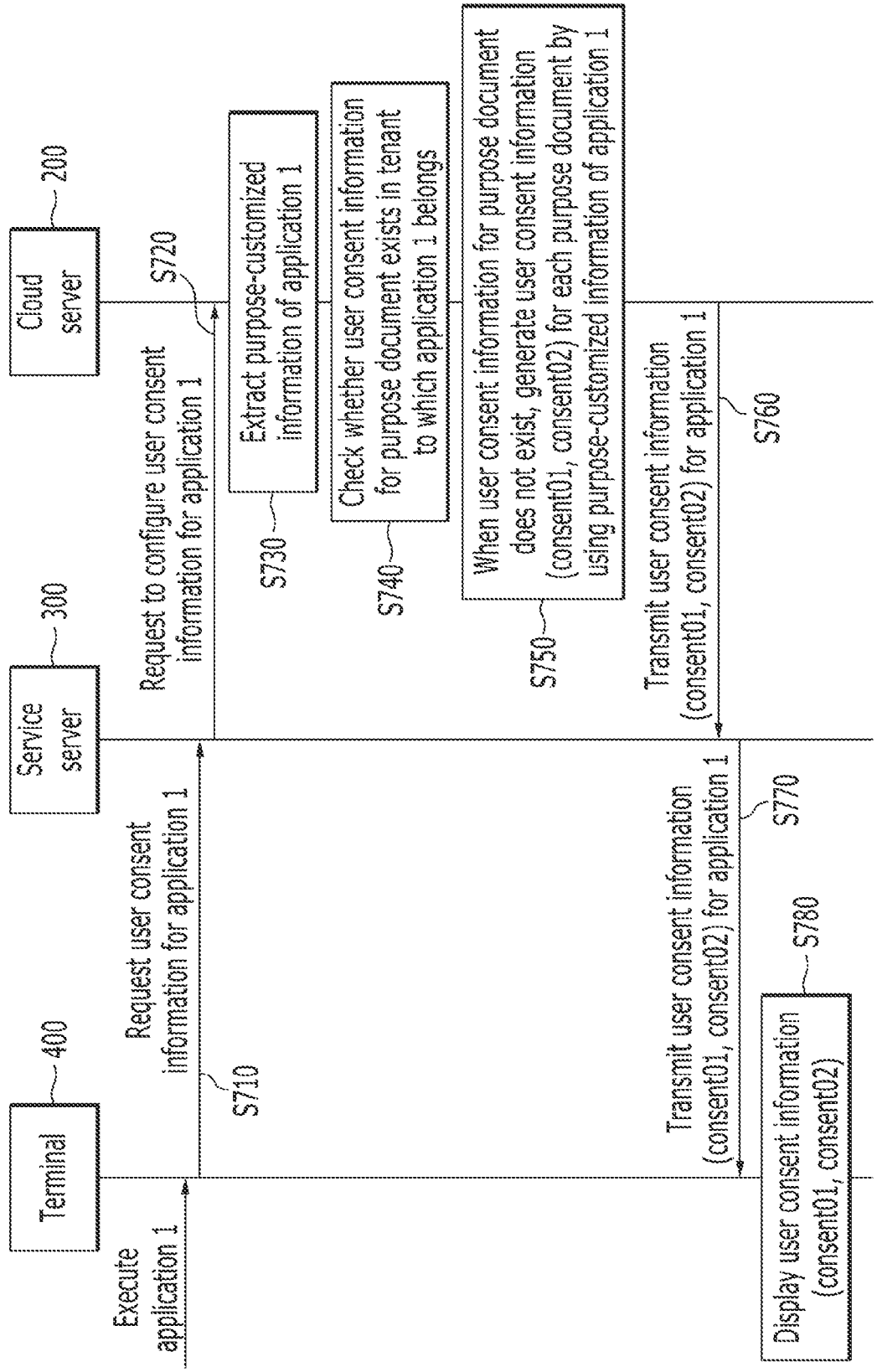
FIG. 9 and FIG. 10 are flowcharts showing a method for sharing user consent information in a tenant according to an example.
Figure 10:
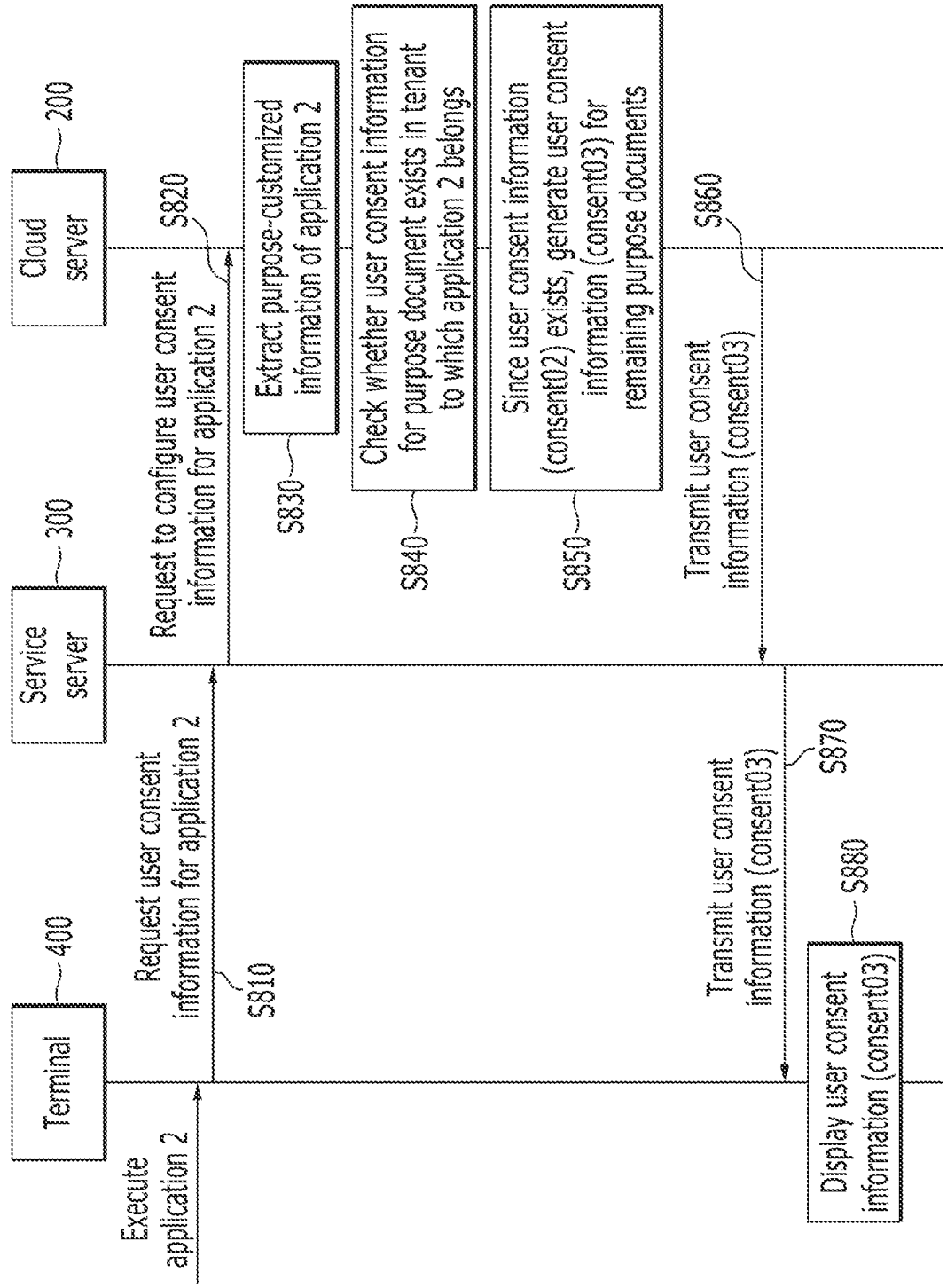

FIG. 9 and FIG. 10 are flowcharts showing a method for sharing user consent information in a tenant according to an example.

Referring to FIG. 9 and FIG. 10, in case of programs managed for the same tenant, the same purpose document may be required by those programs. Accordingly, when configuring user consent information for a certain program, the cloud server 200 may check whether user consent for the purpose document is received from the same user and generate user consent information for the purpose document not having the user consent. Here, the tenant may be a group of programs that require purpose documents and user consent management, and may be a rental resource space (e.g., tenancy) allocated for management thereof.

In an example, it is assumed that application 1 and application 2 belonging to the same tenant are registered in the cloud server 200 as shown in Table 18. It is assumed that the application 1 and the application 2 have the same tenant identifier (e.g., tenantId) and "hp-Common-Privacy-purpose" is the same among the applied purpose documents. Moreover, it is assumed that a user executing application 1 and application 2 is "user01" and the user identification information may be identified with a token issued to a login user. In Table 18, since "originType" is program, it is assumed that "originId" and "programId" are the same.

TABLE 18

| Application1 | originId: application01<br>originType: program<br>tenantId: st01<br>purposeId: app01-email-purpose, hp-Common-Privacy-purpose |
|---|---|
| Application2 | originId: application02<br>originType: program<br>tenantId: st01<br>purposeId: app02-email-purpose, hp-Common-Privacy-purpose |

Referring to FIG. 9, when the application 1 is executed, the terminal 400 may request user consent information for the application 1 from the service server 300 at operation S710. The request for user consent information may include a program identifier (e.g., programId="application01").

The service server 300 may request the cloud server 200 to configure the user consent information for the application 1 at operation S720.

The cloud server 200 may extract purpose-customized information of the application 1 at operation S730.

Based on the purpose-customized information of the application 1, the cloud server 200 may check whether consent information of a user (e.g., userResourceId="user01") for a purpose document (e.g., purposeId="app01-email-purpose," "hp-Common-Privacy-purpose") exists among the user consent information generated in a tenant (e.g., tenantId="st01") to which the application 1 belongs, at operation S740.

When the user consent information for the purpose document does not exist, the cloud server 200 may generate user consent information (e.g., consent01, consent02) of an initial state for each purpose document by using purpose-customized information of the application 1, at operation S750.

The cloud server 200 may transmit the user consent information (e.g., consent01, consent02) to the service server 300 at operation S760.

The service server 300 may transmit the user consent information (e.g., consent01, consent02) to the terminal 400 at operation S770.

The terminal 400 may display the received user consent information (e.g., consent01, consent02), and receive input of consent for the displayed user consent information at operation 87860. As described in FIG. 4, the current state of the user consent information (e.g., consent01, consent02) is updated to the consent (e.g., OptedIn) state and stored in the cloud server 200.

Referring to FIG. 10, after the user has consented (e.g., OptedIn) to the purpose document (e.g., purposeId="app01-email-purpose," "hp-Common-Privacy-purpose"), the terminal 400 may request the user consent information for the application 2 to the service server when the application 2 is executed, at operation S810. The request for the user consent information may include a program identifier (e.g., programId="application02").

The service server 300 may request the cloud server 200 to configure the user consent information for the application 2 at operation S820.

The cloud server 200 may extract purpose-customized information of the application 2 at operation S830.

Based on the purpose-customized information of the application 2, the cloud server 200 may check whether consent information of a user (e.g., userResourceId="user01") for a purpose document (e.g., purposeId="app02-email-purpose," "hp-Common-Privacy-purpose") exists among the user consent information generated in a tenant (e.g., tenantId="st01") to which the application 2 belongs, at operation S840.

Since the user consent information (e.g., consent02) for the purpose document (e.g., purposeId="hp-Common-Privacy-purpose") exists, the cloud server 200 may generate user consent information (e.g., consent03) of an initial state (e.g., NoSelection) for the remaining purpose document (e.g., purposeId="app02-email-purpose"), at operation S850.

The cloud server 200 may transmit the user consent information (e.g., consent03) to the service server 300 at operation S860.

The service server 300 may transmit the user consent information (e.g., consent03) to the terminal 400 at operation S870.

The terminal 400 may display the received user consent information (e.g., consent03) and receive an input of consent for the displayed user consent information at operation S880. As described in FIG. 4, the current state of the user consent information (e.g., consent03) is updated as the consent (e.g., OptedIn) state and stored in the cloud server 200.

Figure 11:
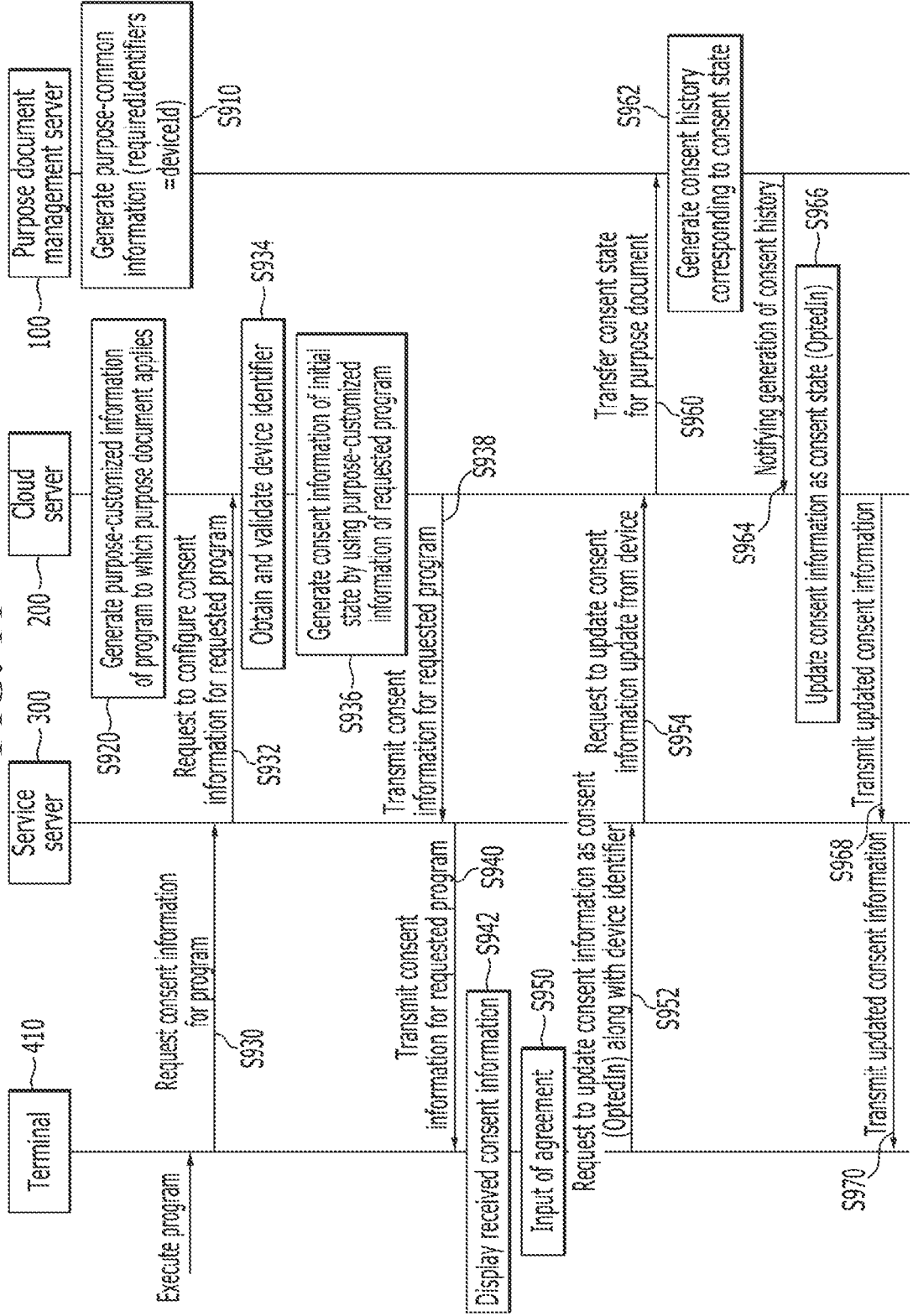
FIG. 11 is a flowchart showing a method for storing device-based consent information according to an example.

FIG. 11 is a flowchart showing a method for storing device-based consent information according to an example.

Referring to FIG. 11, in an environment where a user is in a login state or a user can be identified in various ways, user consent information may be generated and managed. However, in an environment where consent for the purpose document is required but the user does not log in or cannot log in, consent unrelated to the user information may be required. In this case, the device may be identified and consent information obtained by the device may be generated and managed.

An example method for storing and managing device-based consent information is similar to a method described in from FIG. 2 to FIG. 10. Hereinafter, it is described that a terminal 410 requests consent information so as to be distinguished from the terminal 400. Here, the device may be the terminal 410 on which a program is installed or a separate device (e.g., printer device) that may be utilized via a program by the terminal 410. Further, the terminal 410 may be a mobile terminal or a dedicated device such as a printer device. In an example, a device identifier (e.g., deviceId) may be generally a serial number of a device such as a mobile device or a printer device, and in some cases an identifier of a program installed in a device may be used as the "deviceId." The device identifier may be an identifier that is not user identification information.

The purpose document management server 100 may generate purpose-common information for the purpose document (e.g., purposeId="bizops.device.basicfunct.—.hpsmart.print.npf") at operation S910. The purpose-common information may be generated as shown in Table 19, and the identification means (e.g., requiredIdentifiers) required in the purpose document may be "deviceId."

TABLE 19

{
  "purposeId": "bizops.device.basicfunct.-.hpsmart.print.npf,"
  "verbiage": {
    "locale": "en,"
    "version": "1,"
    "statement": "Welcome to HP Smart.HP Automatically collects and analyzes data from your device and account to deliver basic HP Smart app services, as explained in the HP Privacy Statement. By continuing, I agree to the HP Smart Terms of Use and EULA.,"
    "minVersion": "1,"
    "reference":, "https://www.doc.com/doc.pdf"
  },
  "requiredIdentifiers": "deviceId,"
  "processingBasis": "legitimate interest,"
  "organization": "Print"
}

Based on the purpose-common information, the cloud server 200 may generate purpose-customized information of a program to which the purpose document is applied, at operation S920. The purpose-common information may be generated as shown in Table 20, and an identification means (e.g., requiredIdentifierList) required in the purpose document may be "deviceId."

TABLE 20

{
  "resourceId": "5ea775e84b68ab12eb73b67f,"
  "tenantId": "c1a46987-cbd3-45db-b94a-a6544116fc2d,"
  "state": "New,"
  "purposeId": "bizops.device.basicfunct.-.hpsmart.print.npf,"
  "version": "1,"
  "verbiageType": "Text,"
  "verbiageValue": "Welcome to HP Smart. HP Automatically collects and analyzes data from your device and account to deliver basic HP Smart app services, as explained in the HP Privacy Statement. By continuing, I agree to the HP Smart Terms of Use and EULA.,"
  "verbiageLocale": "en,"
  "originType": "Program,"
  "originId": "12630e81-3553-4069-adfd-5a1e33ca02c2,"
  "programId": "12630e81-3553-4069-adfd-5a1e33ca02c2,"
  "requiredIdentifierList": [
    "deviceId"
  ]
}

As shown in FIG. 11, when the installed program is executed, the terminal 410 may request consent information for the corresponding program from the service server 300 at operation S930. For example, the request may include a program identifier (e.g., programId="12630e81-3553-4069-adfd-5a1e33ca02c2"). At this time, the request may further include a device identifier.

The service server 300 may request the cloud server 200 to configure consent information for the requested program at operation S932.

The cloud server 200 may extract the purpose-customized information of the requested program and obtain and validate the device identifier that is an identification means (e.g., requiredIdentifierList) required by the purpose document, at operation S934.

The cloud server 200 may generate consent information of an initial state using the purpose-customized information of the requested program at operation S936. The cloud server 200 may generate consent information of a not-selected (e.g., NoSelection) state as shown in Table 21, according to the properties described in Table 4.

TABLE 21

{
  "resourceId": "5ecbd51bb312f7044f1e22ff,"
  "tenantId": "c1a46987-cbd3-45db-b94a-a6544116fc2d,"
  "state": "NoSelection,"
  "purposeId": "bizops.device.basicfunct.-.hpsmart.print.npf,"
  "purposeResourceId": "5ea775e84b68ab12eb73b67f,"
  "purposeVersion": "1,"
  "originType": "Program,"
  "originId": "12630e81-3553-4069-adfd-5a1e33ca02c2,"
  "verbiageType": "Text,"
  "verbiageValue": "Welcome to HP Smart.HP Automatically collects and analyzes data from your device and account to deliver Privacy basic HP Smart app services, as explained in the HP Statement. By continuing, I agree to the HP Smart Terms of Use and EULA.,"
    "verbiageLocale": "en,"
    "userResourceId": null,
    "dateTime": "0000"
}

The cloud server 200 may transmit consent information for the requested program to the service server 300 at operation S938. The consent information for the requested program may be consent information generated with resourceId="5ecbd51 bb312f7044f1e22ff."

The service server 300 may transmit the requested consent information to the terminal 410 at operation S940.

The terminal 410 may display the received consent information at operation S942. Here, the terminal 410 may display consent information without being logged in.

The terminal 410 may receive input of agreement for the consent information at operation S950.

The terminal 410 may transmit a request to update the consent information (e.g., resourceId="5ecbd51bb312f7044f1e22ff") as a consent (e.g., OptedIn) state, along with a device identifier, at operation S952.

The service server 300 may request the cloud server 200 to update consent information in the device at operation S954.

The cloud server 200 may transfer the consent state for the purpose document to a purpose document management server 100 at operation S960.

The purpose document management server 100 may generate a consent history including a consent processing action corresponding to the device identifier at operation S962. According to the properties of Table 2, the purpose document management server 100 may generate a history where the consent processing action is consent (e.g., opt-in), as shown in Table 22. The consent history may include a purpose document identifier (e.g., purposeId), a consent processing action, a consent processing identifier (e.g., transactionId), a processing date and time (e g., transaction-Date), and the like. In addition, the consent history may include information (e,g., dataSubject) obtained according to the identification means (e.g., requiredIdentifiers="deviceId") required in the purpose document, a public identifier (e.g., clientId) of the program that generated the consent information, and the like.

TABLE 22

{
  "purposeId": "bizops.device.basicfunct.-.hpsmart.print.npf,"
  "action": "opt-in,"
  "transactionDate": "2020-05-25T07:46:52.79Z,"
  "transactionId": "a21b54ff-8d91-4934-ba02-0fe02ac20c5c,"
  "clientID": "HejNX6ID6acXI8exgqFugPTRGrSTU3np,"
  "dataSubject": {
    "deviceId": "a68c79eb-a18a-417e-a2db-c52761919b70"
  },
  "organization": "HP"
  "verbiage": {
    "locale": "en,"
    "version": "1"
  }
}

The purpose document management server 100 may notify the generation of consent history generation to the cloud server 200 at operation S964.

The cloud server 200 may update the consent information to the consent state (e.g., OptedIn) at operation S966. The cloud server 200 may update the consent information of Table 21 as shown in Table 23.

TABLE 23

{
  "resourceId": "5ecbd51bb312f7044f1e22ff,"
  "tenantId": "c1a46987-cbd3-45db-b94a-a6544116fc2d,"
  "state": "OptedIn,"
  "purposeId": "bizops.device.basicfunct.-.hpsmart.print.npf,"
  "purposeResourceId": "5ea775e84b68ab12eb73b67f,"
  "purposeVersion": "1,"
  "originType": "Program,"
  "originId": "12630e81-3553-4069-adfd-5a1e33ca02c2,"
  "verbiageType": "Text,"
  "verbiageValue": "Welcome to HP Smart.HP Automatically collects and analyzes data from your device and account to deliver basic HP Smart app services, as explained in the HP Privacy Statement. By continuing, I agree to the HP Smart Terms of Use and EULA.,"
    "verbiageLocale": "en,"
    "userResourceId": null,
    "dateTime": "2020-05-25T14:24:27.799Z"
}

The cloud server 200 may transfer the updated consent information to the service server 300 at operation S968.

The service server 300 may transmit the updated consent information to the terminal 400 at operation S970 and the terminal 400 may display the updated consent information.

Figure 12:
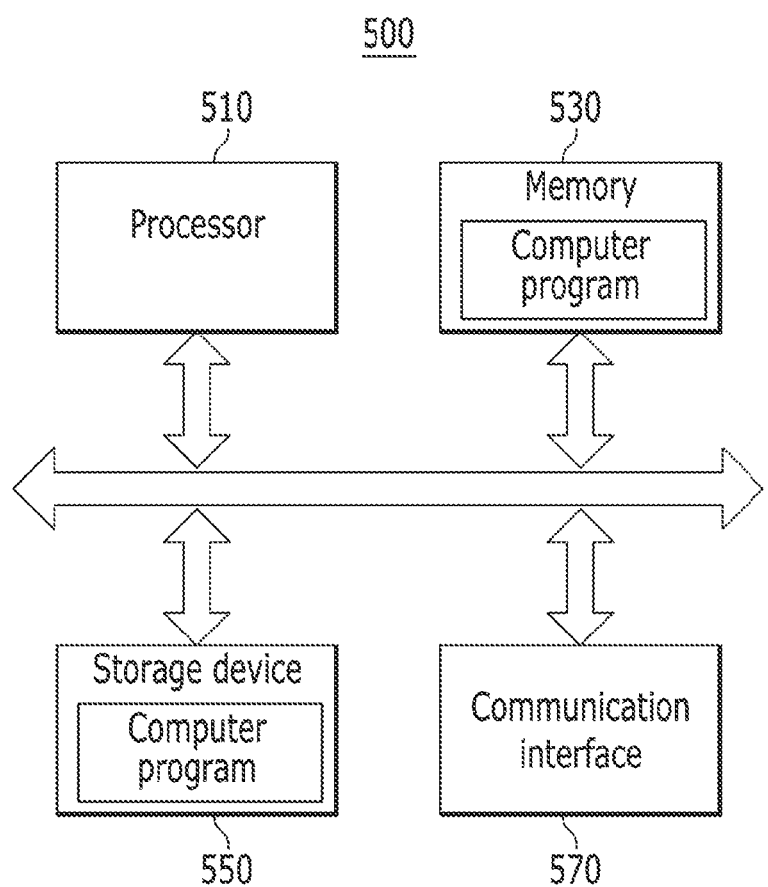
FIG. 12 illustrates a computing device according to an example.

FIG. 12 illustrates a computing device according to an example.

Referring to FIG. 12, the purpose and consent management system 10 may be implemented as a computing device 500 and may execute a computer program including instructions to perform the operations of examples of the present disclosure. Alternatively, each of the purpose document management server 100, the cloud server 200, and the service server 300 may be implemented as a computing device 500, and may execute a computer program including instructions to perform the operations of examples of the present disclosure.

The hardware of the computing device 500 may include a processor 510, a memory 530, a storage device 550, and a communication interface 570, which may be connected via a bus therebetween. In addition, hardware such as an input device and an output device may be included. Various software including an operating system capable of driving the computer program may be installed on the computing device 500.

The processor 510 is a device to control operations of the computing device 500, and may be any of various types of processors to process instructions included in a computer program. For example, the processor 510 may be a central processing unit (CPU), a micro processor unit (MPU), a micro controller unit (MCU), a graphic processing unit (MPU), and the like. Also, the processor 510 may perform operations of a program for executing the above-described method.

The memory 530 may store various data, commands and/or information. The memory 530 may load a corresponding computer program from the storage device 550 such that instructions described to perform operations of an example of the present disclosure are processed by the processor 510. The memory 530 may be, for example, a read only memory (ROM), a random access memory (RAM), and the like. The storage device 550 may store various data, computer programs, and the like that may be used to perform operations of an example of the present disclosure. The storage device 550 may store a computer program non-temporarily. The storage device 550 may be implemented with a non-volatile memory. The communication interface 570 may be a wired/wireless communication module (e.g., a transceiver).

A computer program including instructions for performing operations of an example of the present disclosure may be stored in a medium readable by a computing device, and the medium readable by the computing device may be a removable recording medium or a fixed recording medium. The computer program may be transmitted to another computing device via a network such as the Internet and installed and executed on another computing device.

According to an example, the computing device 500 may store a computer program related to the operation of the cloud server 200 and execute a computer program to perform an example of the above-described operations. The computing device 500 may include a memory 530 and a processor 510 to execute instructions of a computer program loaded in the memory 530, and the computer program may include instructions to perform an example of the method described above. The processor 510 may register an application target (e.g., program or offering service), obtain common information of the purpose documents, and generate purpose-customized information for the application target by combining information of the application target with purpose-common information. The processor 510 may generate the user consent information by combining the user information with the purpose-customized information according to a request from the terminal on which the application target is executed. Further, the processor 510 may update the state of the user consent information (e.g., state="OptedIn") according to information (e.g., agreement) input for the user consent information in the terminal. The processor 510 may change the state of the user consent information to the consent (e.g., OptedIn) state when an agreement to the user consent information is input at the terminal. When the withdrawal of the user consent information is input, the processor 510 may change the state of the user consent information to a withdrawal (e.g., OptedOut) state. When the common information of the purpose document is updated, the processor 510 may generate updated purpose-customized information by using the updated common information and may update the user consent information according to the updated purpose-customized information. Here, the state of the user consent information may be changed to the state of re-consent request (e.g., ReOptedInRequired) state. The processor 510 may change the state of the user consent information to the consent (e.g., OptedIn) state, when an agreement to the user consent information in the state of re-consent request is input. When the state of the user consent information is updated according to input from the terminal, the processor 510 may transmit the user consent state for the purpose document to the predetermined server (e.g., purpose document management server). The user consent state for the purpose document may be recorded as a user consent history.

According to an example, the computing device 500 may perform an example of the above-described operations by executing a computer program related to at least some operations of the purpose and consent management system 10. The processor 510 of the computing device 500 may generate purpose-common information by configuring the purpose document with predetermined properties. Further, if an application target (e.g., program or offering service) of the purpose document is registered, the processor 510 may generate the purpose-customized information for the application target by combining the purpose-common information with the information of the application target. The processor 510 may receive a request for the user consent information from the terminal executing the application target, generate the user consent information by combining the purpose-customized information with the user information, and update the state of the user consent information according to the information input regarding the user consent information at the terminal.

When the computing device executes a program managing device-based information according to an example, upon registering an application target (e.g., program or offering service) of the purpose document, the processor 510 of the computing device 500 may obtain common information of the purpose document and generate the purpose-customized information for the application target by combining information of the application target with the purpose-common information. When the identification means required in the purpose document is a device identifier, the processor 510 may generate device-based consent information by combining the obtained device identifier with the purpose-customized information, and update the state of the consent information according to the information input from a terminal receiving the consent information.

Figure 13:
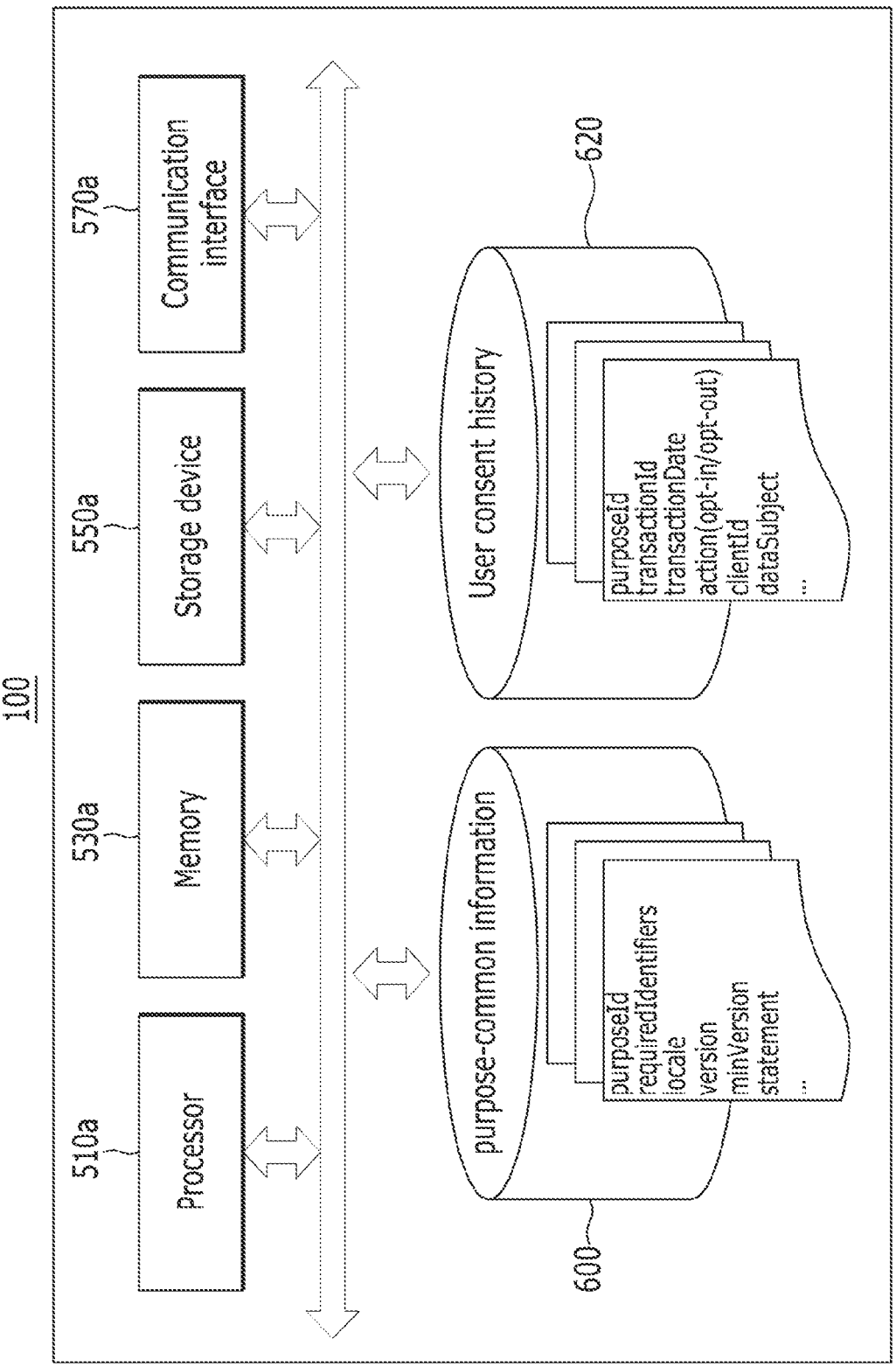
FIG. 13 illustrates a purpose document management server according to an example.
Figure 14:
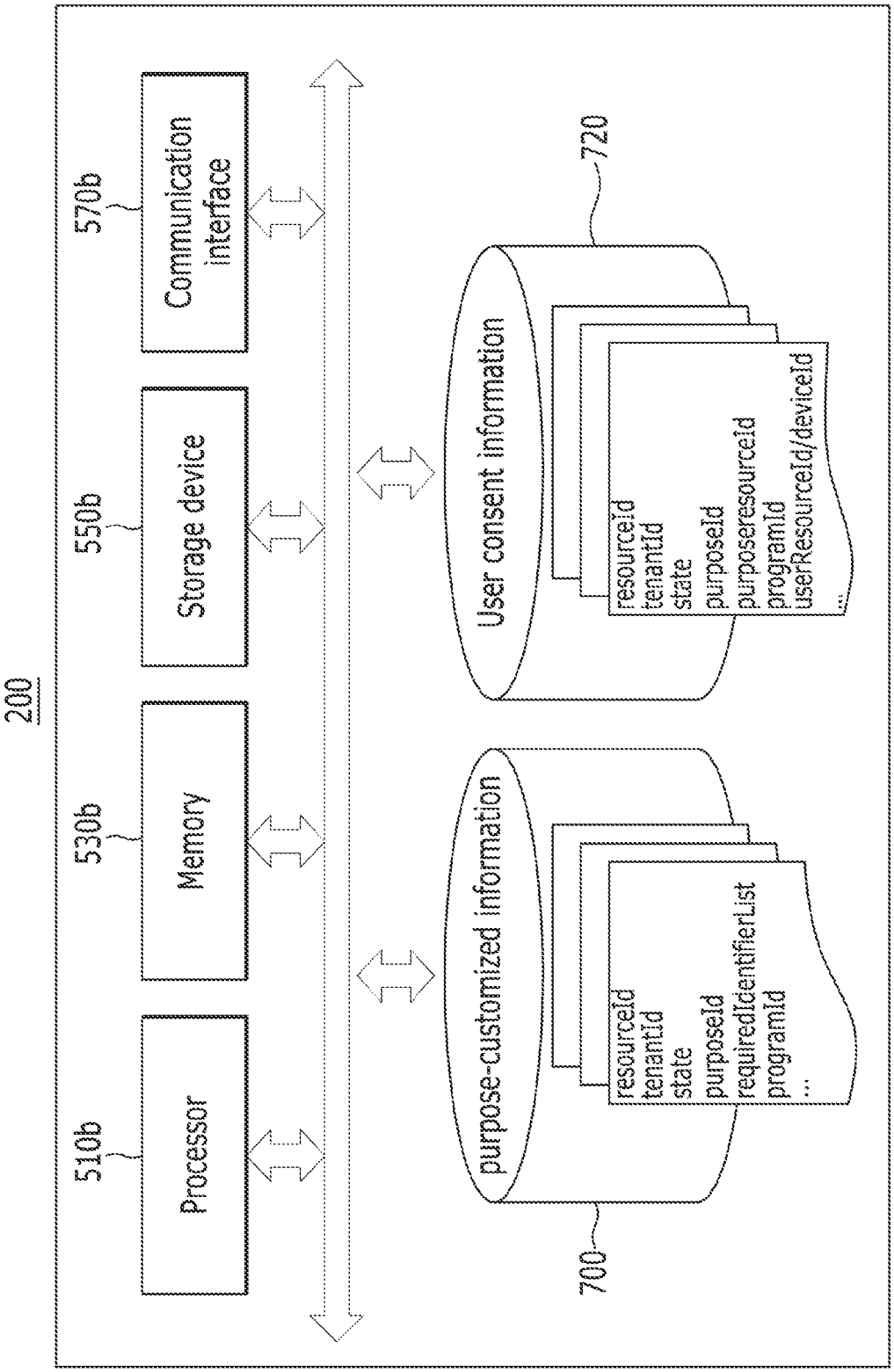
FIG. 14 illustrates a cloud server according to an example.

FIG. 13 illustrates a purpose document management server according to an example. FIG. 14 illustrates a cloud server according to an example.

Referring to FIG. 13, the purpose document management server 100 may be implemented as a computing device including a processor 510a, a memory 530a, a storage device 550a, and a communication interface 570a. The purpose document management server may further include a repository 600 to store purpose-common information for each purpose document generated according to operations and a repository 620 to store the generated consent history. The repositories 600 and 620 are differentiated for the purpose of explanation and are not required to be separately implemented in view of hardware. Also, the repositories 600 and 620 may store necessary information or data in addition to the purpose-common information or consent history for each purpose document.

When the purpose document is newly registered or updated, the processor 510*a* may generate or update the purpose-common information according to a predetermined method and register the generated or updated purpose-common information in the repository 600. Upon receiving a request for purpose-common information of a purpose document identifier (e.g., purposeId) from the cloud server 200, the processor 510*a* may extract the purpose-common information of the purpose document identifier from the repository 600 and transfer to the cloud server 200.

The processor 510*a* may receive information notifying update of the state of the user consent information for the purpose documents from the cloud server 200, and store a user consent history recording user consent processing action, processing time and date, and the like for the purpose document in the repository 620.

Referring to FIG. 14, a cloud server 200 may be implemented as a computing device including a processor 510*b*, a memory 530*b*, a storage device 550*b*, and a communication interface 570*b*, and may be equipped in a cloud platform. The cloud server 200 may include a repository 700 to store purpose-customized information for each application target generated according to the operation, and a repository 720 to store generated user consent information. Repositories 700 and 720 are differentiated for the purpose of explanation and are not required to be separately implemented in view of hardware. Also, the repositories 700 and 720 may store necessary information or data in addition to the purpose-customized information or consent history for each purpose document.

The repositories 700 and 720 may be a resource space (e.g., tenancy) to which at least one tenant identifier (e.g., tenantId) is given, and in an allocated tenancy a resource identifier (e.g., resourceId) of the purpose-customized information or the user consent information may be given.

Upon receiving a registration request of an application target (e.g., program or offering service) of the purpose document, the processor 510*b* may generate the purpose-customized information by combining information of the application target with the purpose-common information obtained from the purpose document management server 100 and store in the repository 700. The processor 510*b* may update the state of the purpose-customized information stored in the repository 700.

According to a request from a terminal on which the application target is executed, the processor 510*b* may generate the user consent information by combining user information with the purpose-customized information and store in the repository 720. The processor 510*b* may update the state of the user consent information stored in the repository 720.

As described above, the purpose and consent management system 10 manages various purpose documents. Therefore, according to examples, the management cost of the purpose documents can be reduced, and the purpose documents in a common format and content can be provided to the user. For example, purpose documents that need to support various languages may be easily managed and the cost for translation of the purpose documents may be reduced.

The purpose and consent management system 10 may generate user consent information based on the purpose document and manage user consent in a current state and the past consent history. Therefore, according to an example, even though an issue related to user consent occurs, necessary information may be checked through the history.

The purpose and consent management system 10 may maintain the latest user consent information. Therefore, according to an example, the latest user consent information may be provided whenever the user requests. As a result, the user can easily check the user consent information for which the user has consented.

The above-described examples of the present disclosure are not implemented only through an apparatus and a method, but may be implemented through a program that realizes a function corresponding to the configuration of the examples of the present disclosure or a non-transitory recording medium on which the program is recorded.

Although examples have been described above, the present invention is not limited thereto, and the present invention may be modified in various ways within the scope of the claims and the detailed description and accompanying drawings of the invention, which fall within the scope of the present invention.

What is claimed is:

1. An operation method of a server executed by a processor, the method comprising:
   registering a target to which a purpose document is applied;
   obtaining an identifier of the purpose document and properties of the purpose document;
   generating purpose-customized information for the target by combining the identifier of the purpose document and the properties of the purpose document with information of the target;
   generating user consent information by combining the purpose-customized information with user information, according to a request from a terminal on which the target is executed; and
   updating a state of the user consent information according to information input for the user consent information from the terminal.

2. The method of claim 1, wherein the updating of the state of the user consent information comprises changing the state of the user consent information to a consent state upon receiving an input of agreement to the user consent information from the terminal.

3. The method of claim 1, wherein the updating of the state of the user consent information comprises changing the state of the user consent information to a withdrawal state upon receiving an input of withdrawal of the user consent information from the terminal.

4. The method of claim 1, further comprising:
   generating updated purpose-customized information by using an updated identifier of the purpose document and updated properties of the purpose document when the identifier of the purpose document and properties of the purpose document are updated;
   updating the user consent information according to the updated purpose-customized information; and
   changing the state of the user consent information to a re-consent request state.

5. The method of claim 4, wherein the state of the user consent information is changed to a consent state when an input of agreement to the user consent information in the re-consent request state is received from the terminal.

6. The method of claim 1, further comprising transferring the user consent state for the purpose document to a server when the state of the user consent information is updated according to the information input from the terminal, wherein the user consent state for the purpose document is recorded as a user consent history.

7. An operation method of a server executed by a processor, the method comprising:
generating purpose information based on a purpose document with predetermined properties of the purpose document and a predetermined identifier of the purpose document;
when a target to which the purpose document is applied is registered, generating purpose-customized information for the target by combining the purpose information with information of the target;
receiving a request for user consent information from a terminal executing the target;
generating the user consent information by combining user information with the purpose-customized information; and
updating a state of the user consent information according to information input for the user consent information from the terminal.

8. The method of claim 7, wherein the updating of the state of the user consent information comprises:
changing the state of the user consent information to a consent state upon receiving an input of agreement to the user consent information from the terminal; and
changing the state of the user consent information to a withdrawal state upon receiving an input of withdrawal of the user consent information from the terminal.

9. The method of claim 7, further comprising:
generating updated purpose information when the purpose document is updated;
generating updated purpose-customized information by using the updated purpose information;
updating the user consent information according to the updated purpose-customized information; and
changing the state of the user consent information to a re-consent request state.

10. The method of claim 9, further comprising changing the state of the user consent information to a consent state when an input of agreement to the user consent information in the re-consent request state is received from the terminal.

11. The method of claim 7, further comprising recording the user consent state for the purpose document as a user consent history when the state of the user consent information is changed according to the information input from the terminal.

12. The method of claim 7, wherein the user consent information comprises an identifier of the purpose document, an identifier of the target, a user identifier, information of the purpose document, or a state of the user consent information.

13. The method of claim 7, wherein the purpose-customized information comprises an identifier of the purpose document, an identifier of the target, or information of the purpose document.

14. The method of claim 7, wherein the generating of the user consent information comprises:
determining whether consent information of a same user for the purpose document exists in a tenant where the target belongs; and
generating the user consent information by combining the user information with the purpose-customized information when it is determined that the consent information does not exist.

15. An operation method of a server executed by a processor, the method comprising:
obtaining an identifier of a purpose document and properties of the purpose document when a target to which the purpose document is applied is registered;
generating purpose-customized information for the target by combining information of the target with the identifier of the purpose document and the properties of the purpose document;
when identification information in the purpose document includes a device identifier, generating device-based consent information by combining the obtained device identifier with the purpose-customized information; and
updating a state of the consent information according to information input from a terminal that receives the consent information.

16. The method of claim 1, wherein the properties of the purpose documents comprise:
processing criteria of the purpose document;
user identifiers required by the purpose document; and
version information of the purpose document.

17. The method of claim 1, wherein the purpose-customized information comprises:
an identifier of the purpose customized information;
a tenant identifier;
a state identifier of purpose-customized information;
a version identifier; and
a program identifier.

* * * * *